(12) United States Patent
Awerbuch et al.

(10) Patent No.: US 9,910,414 B2
(45) Date of Patent: Mar. 6, 2018

(54) SEMI-AUTONOMOUS RESCUE APPARATUS

(75) Inventors: Jonathan Awerbuch, Media, PA (US); Tein-Min Tan, Marlton, NJ (US); Adam C. Carlson, Annandale, VA (US); William Scott Goehringer, North Brunswick, NJ (US); Clayton Powers, Columbia, MD (US); Jordan H. Shenk, East Norriton, PA (US); David M. Snyder, El Dorado, AR (US); Marnus G. Van Zyl, Chadds Ford, PA (US)

(73) Assignee: Drexel University, Philadelphia, PA (US)

( * ) Notice: Subject to any disclaimer, the term of this patent is extended or adjusted under 35 U.S.C. 154(b) by 496 days.

(21) Appl. No.: 14/116,008

(22) PCT Filed: May 8, 2012

(86) PCT No.: PCT/US2012/036893
§ 371 (c)(1),
(2), (4) Date: Oct. 22, 2014

(87) PCT Pub. No.: WO2012/154718
PCT Pub. Date: Nov. 15, 2012

(65) Prior Publication Data
US 2015/0094859 A1    Apr. 2, 2015

Related U.S. Application Data

(60) Provisional application No. 61/484,217, filed on May 9, 2011, provisional application No. 61/486,585, filed
(Continued)

(51) Int. Cl.
*G05B 15/02*    (2006.01)
*B23D 47/08*    (2006.01)
(Continued)

(52) U.S. Cl.
CPC ............. *G05B 15/02* (2013.01); *B23D 47/08* (2013.01); *B23D 47/126* (2013.01);
(Continued)

(58) Field of Classification Search
CPC .. B23D 47/08; B23D 47/126; B23D 57/0084; G05B 15/02; A01G 23/08; A01G 23/091;
(Continued)

(56) References Cited

U.S. PATENT DOCUMENTS 4,250,935 A * 2/1981 Helgesson ............... B27B 1/002
                                                        144/24.13
5,390,715 A * 2/1995 Luscombe ........... A01G 23/091
                                                        144/24.13
(Continued)

FOREIGN PATENT DOCUMENTS

WO    WO 2012/154718 A1    11/2012

OTHER PUBLICATIONS

International Patent Application No. PCT/US2012/036893: International Search Report and Written Opinion dated Jul. 18, 2012, 15 pages.

*Primary Examiner* — Ghassem Alie
*Assistant Examiner* — Nhat Chieu Do
(74) *Attorney, Agent, or Firm* — Joseph E. Maenner; Maenner & Associates, LLC

(57) ABSTRACT

A cutting device is configured to attach to a boom arm and includes a saw assembly with a cutting portion configured to cut into a target surface. The cutting device also includes a motor assembly coupled to the saw assembly. The motor assembly has at least two motors configured to rotate the saw assembly about two different axes. The cutting device further comprises a control system operatively coupled to the motor assembly. The control system has at least two sensors coupled to the saw assembly and the control system is
(Continued)

configured to position the saw assembly to cut a target surface based on feedback from the at least sensors.

17 Claims, 29 Drawing Sheets

Related U.S. Application Data on May 16, 2011, provisional application No. 61/489,908, filed on May 25, 2011.

(51) Int. Cl.
  *B23D 47/12*    (2006.01)
  *B23D 57/00*    (2006.01)
  *B27B 5/10*     (2006.01)
  *B27B 5/20*     (2006.01)

(52) U.S. Cl.
  CPC ............ *B23D 57/0084* (2013.01); *B27B 5/10* (2013.01); *B27B 5/208* (2013.01)

(58) Field of Classification Search
  CPC ...... A01G 23/093; A01G 23/095; B27B 5/10; B27B 35/208
  USPC ....... 144/384, 400, 401, 420, 421, 422, 423, 144/425; 901/46–47; 83/361–372, 83/471–473
  See application file for complete search history.

(56) References Cited

U.S. PATENT DOCUMENTS

| | | | |
|---|---|---|---|
| 5,501,257 A * | 3/1996 | Hickman | A01G 23/091 144/335 |
| 6,206,441 B1 * | 3/2001 | Wen | H01L 21/67259 294/213 |
| 6,968,877 B1 | 11/2005 | Stokkeland | |
| 7,474,296 B2 | 1/2009 | Obermeyer et al. | |
| 7,729,886 B2 | 6/2010 | Sherrill | |
| 2002/0017178 A1 * | 2/2002 | Gass | B23D 47/08 83/58 |
| 2002/0035908 A1 * | 3/2002 | Kawashima | B29D 30/68 83/368 |
| 2003/0123044 A1 | 7/2003 | Oka | |
| 2006/0162816 A1 * | 7/2006 | Hyysti | B27L 5/022 144/365 |
| 2008/0017182 A1 | 1/2008 | Hilsgen | |
| 2010/0018514 A1 | 1/2010 | Wills | |

\* cited by examiner

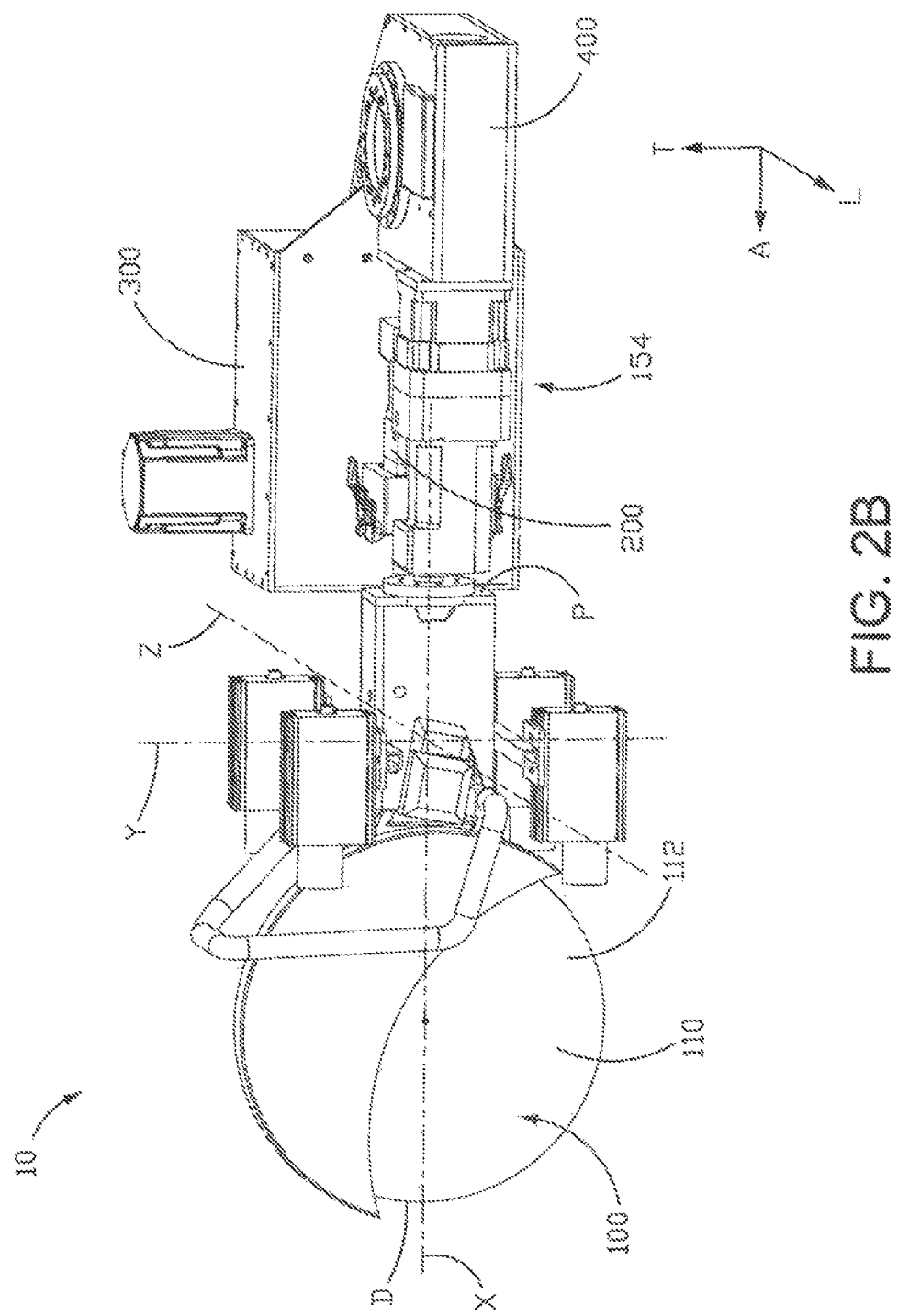

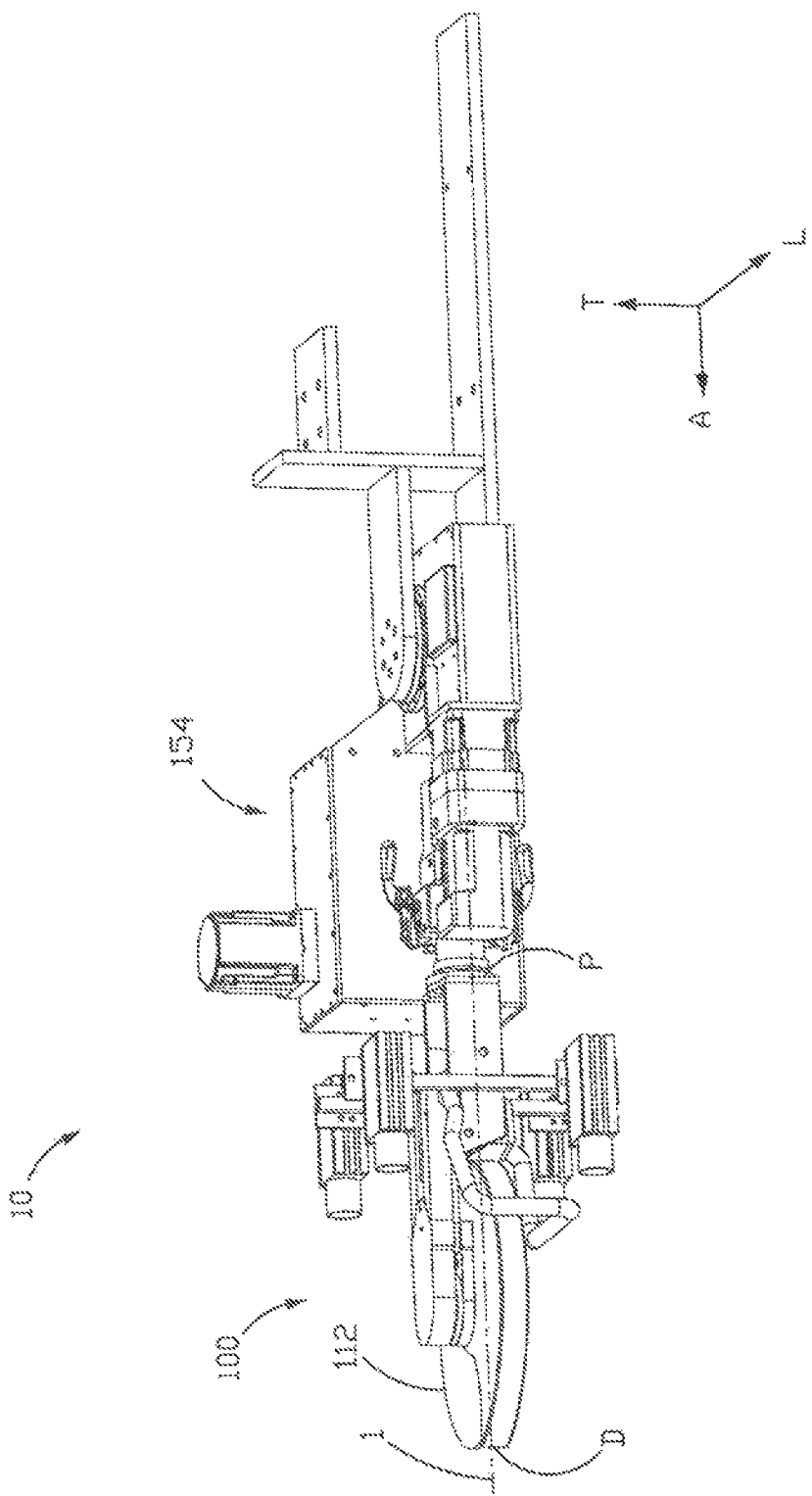

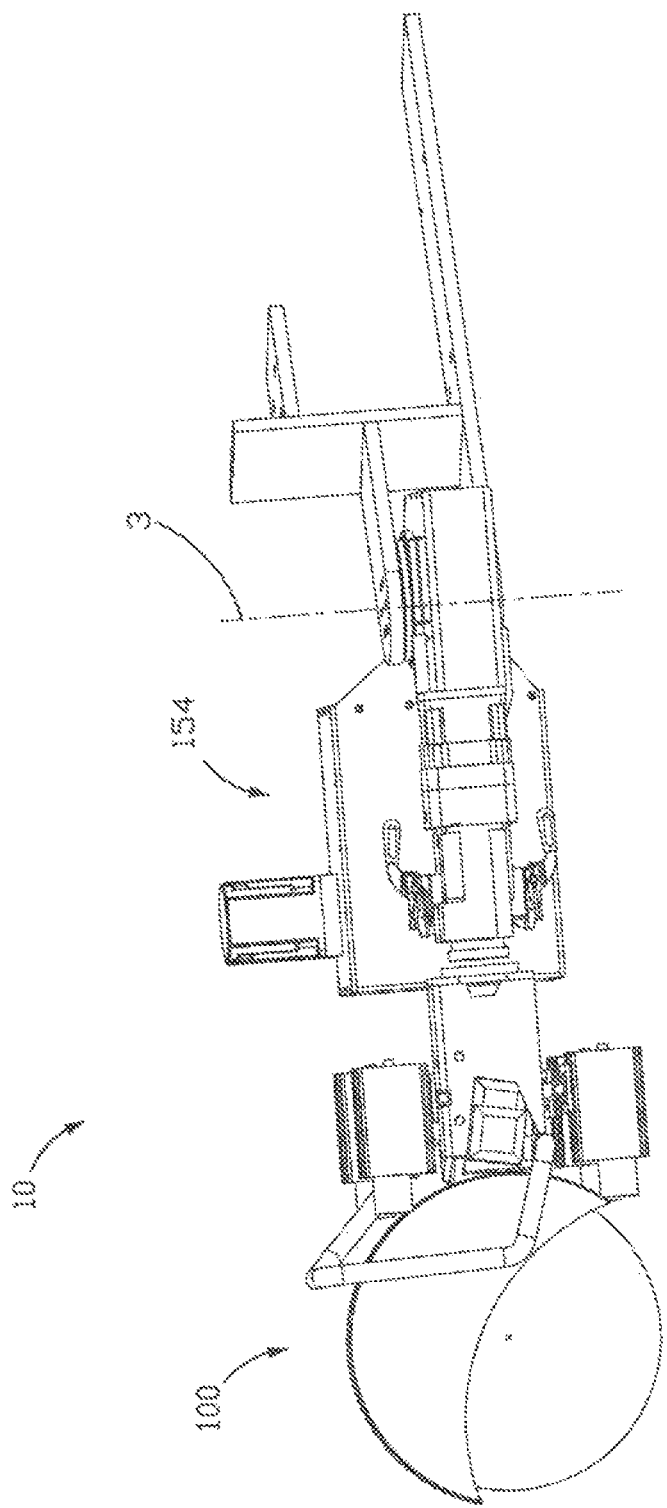

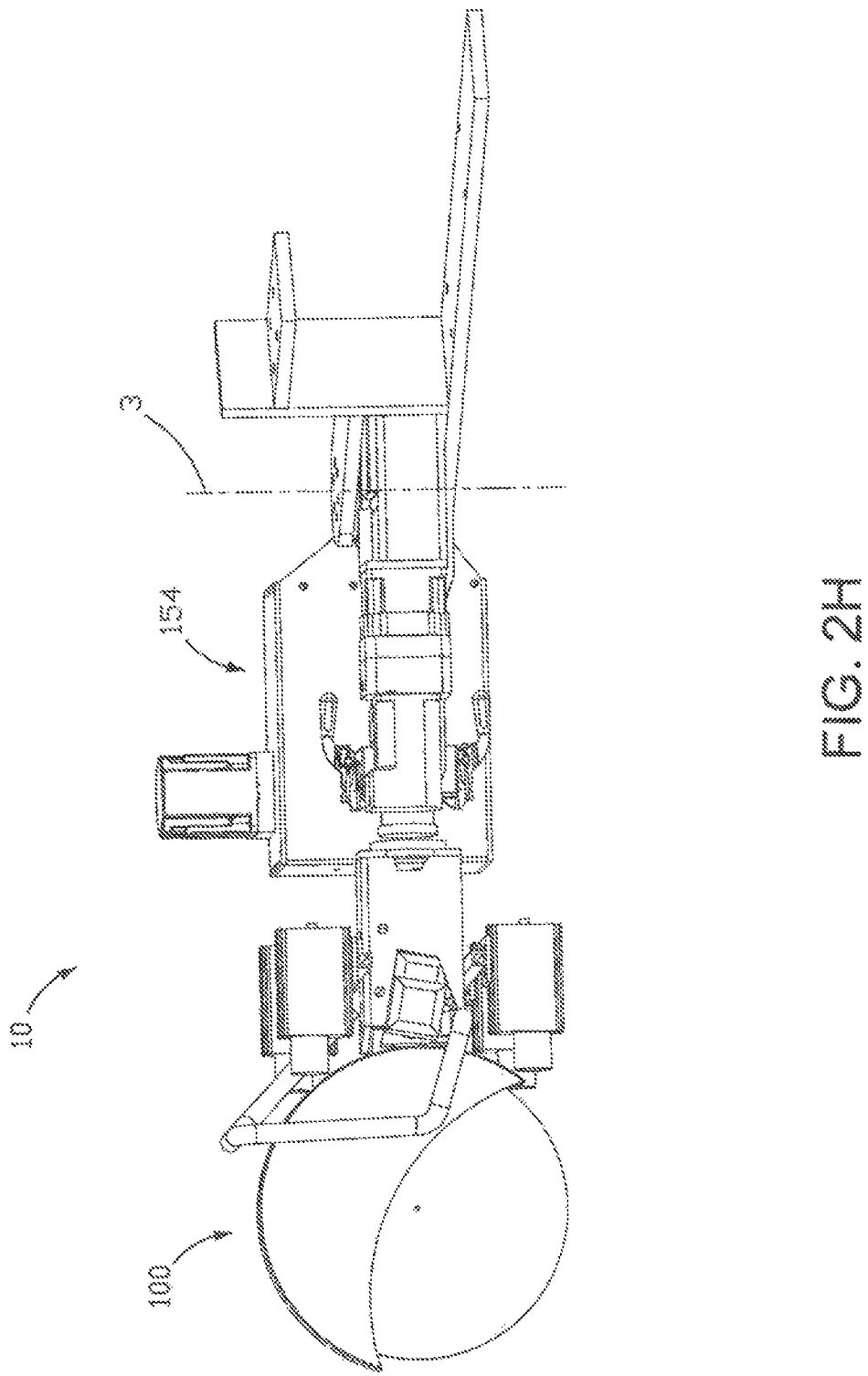

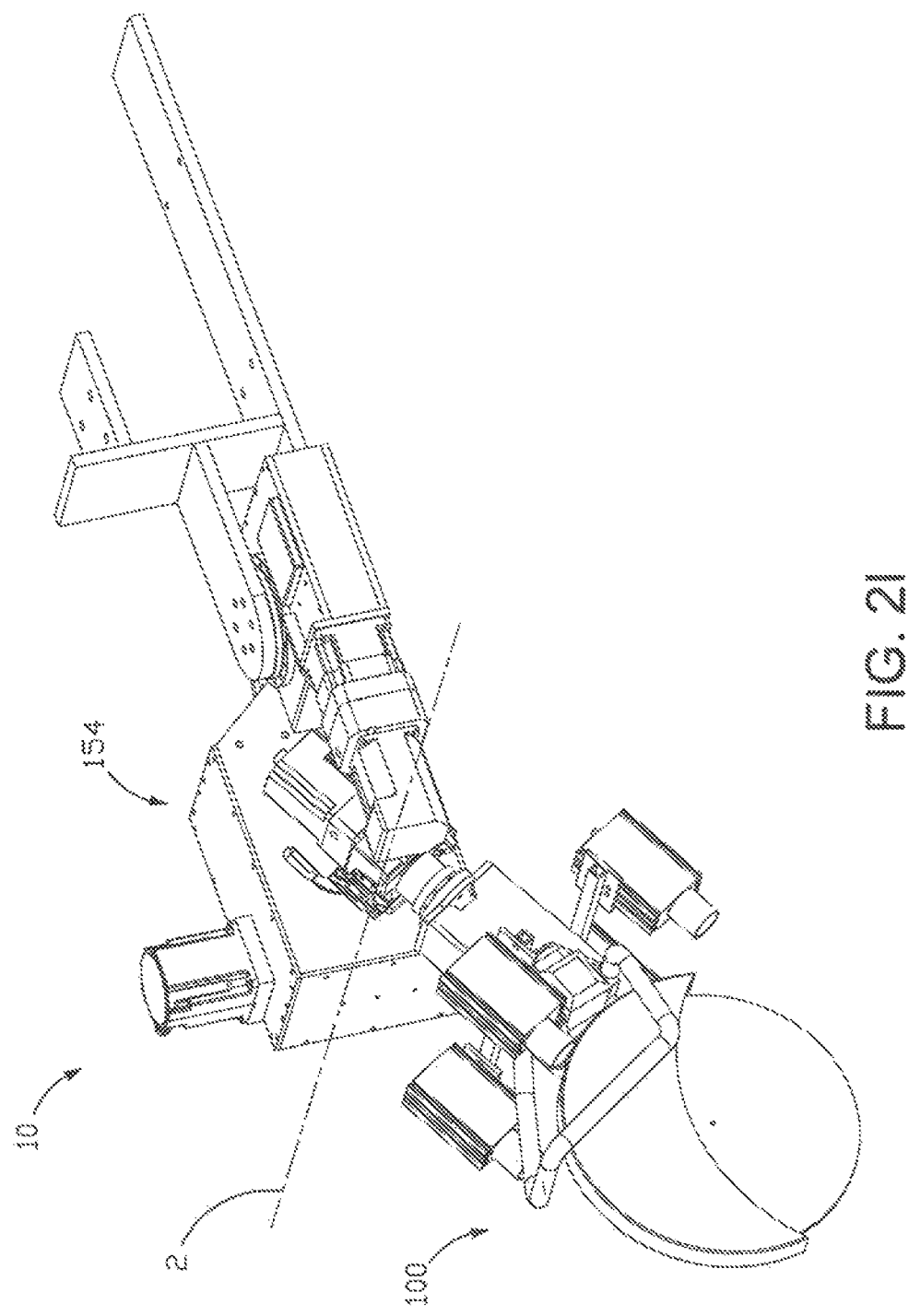

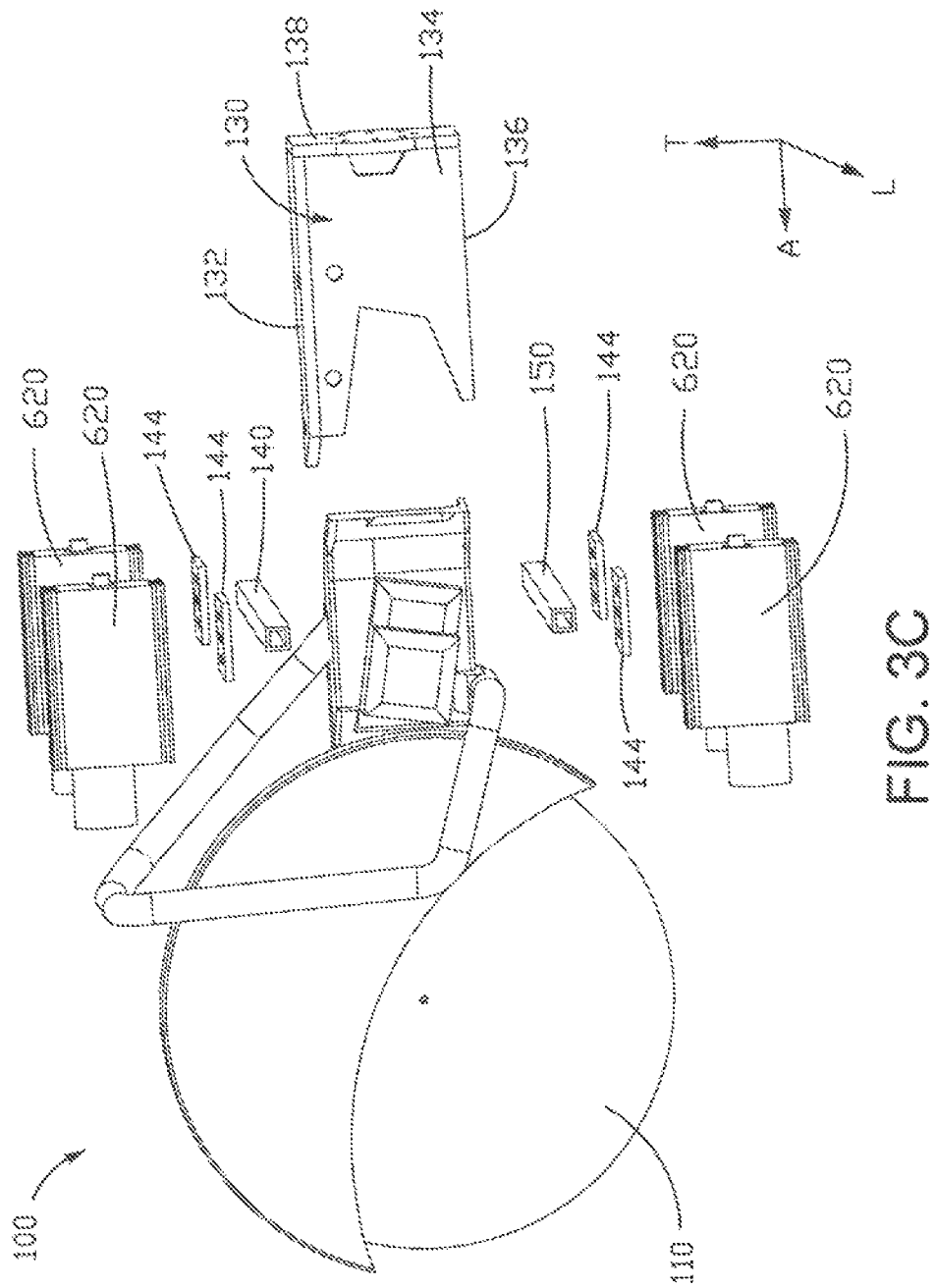

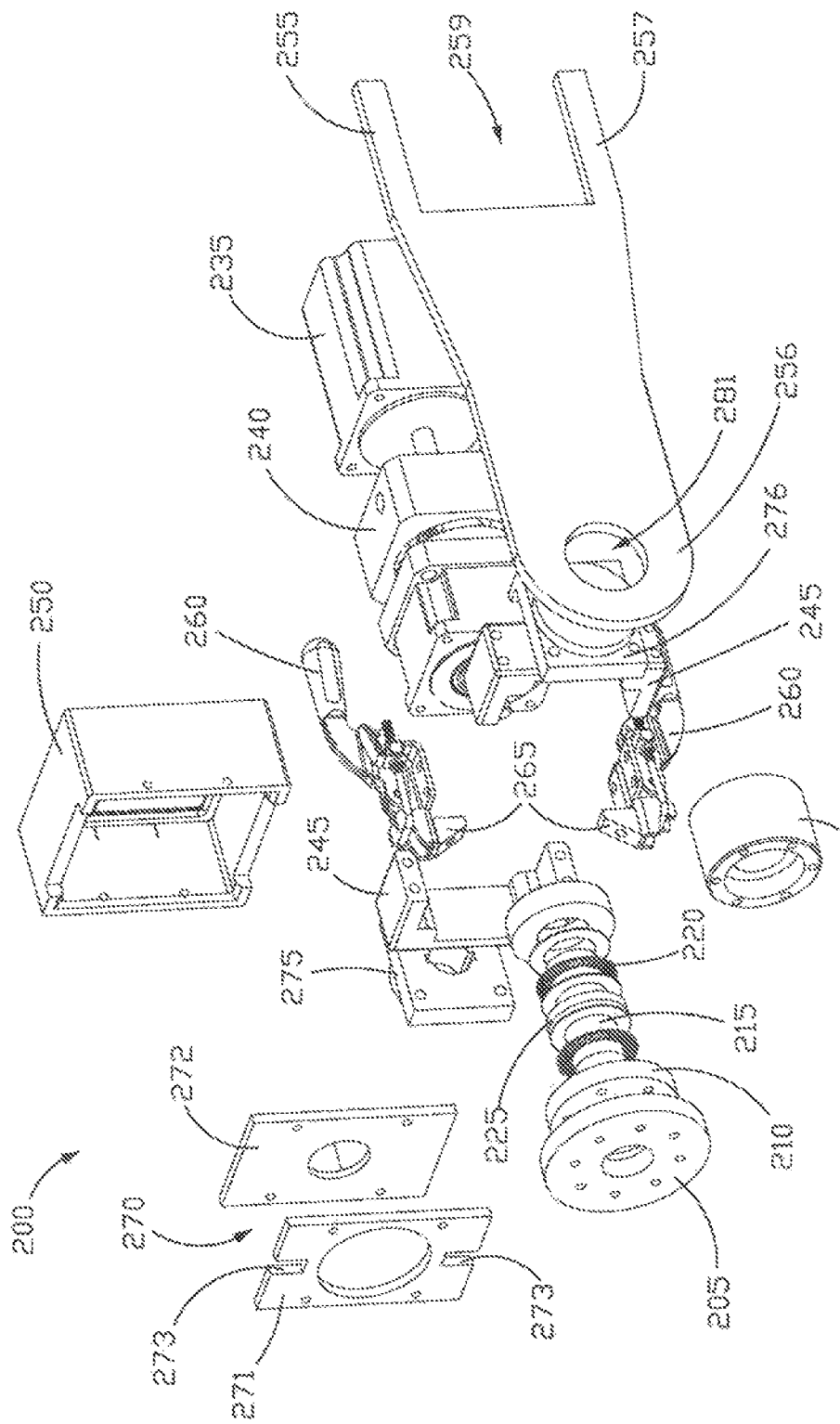

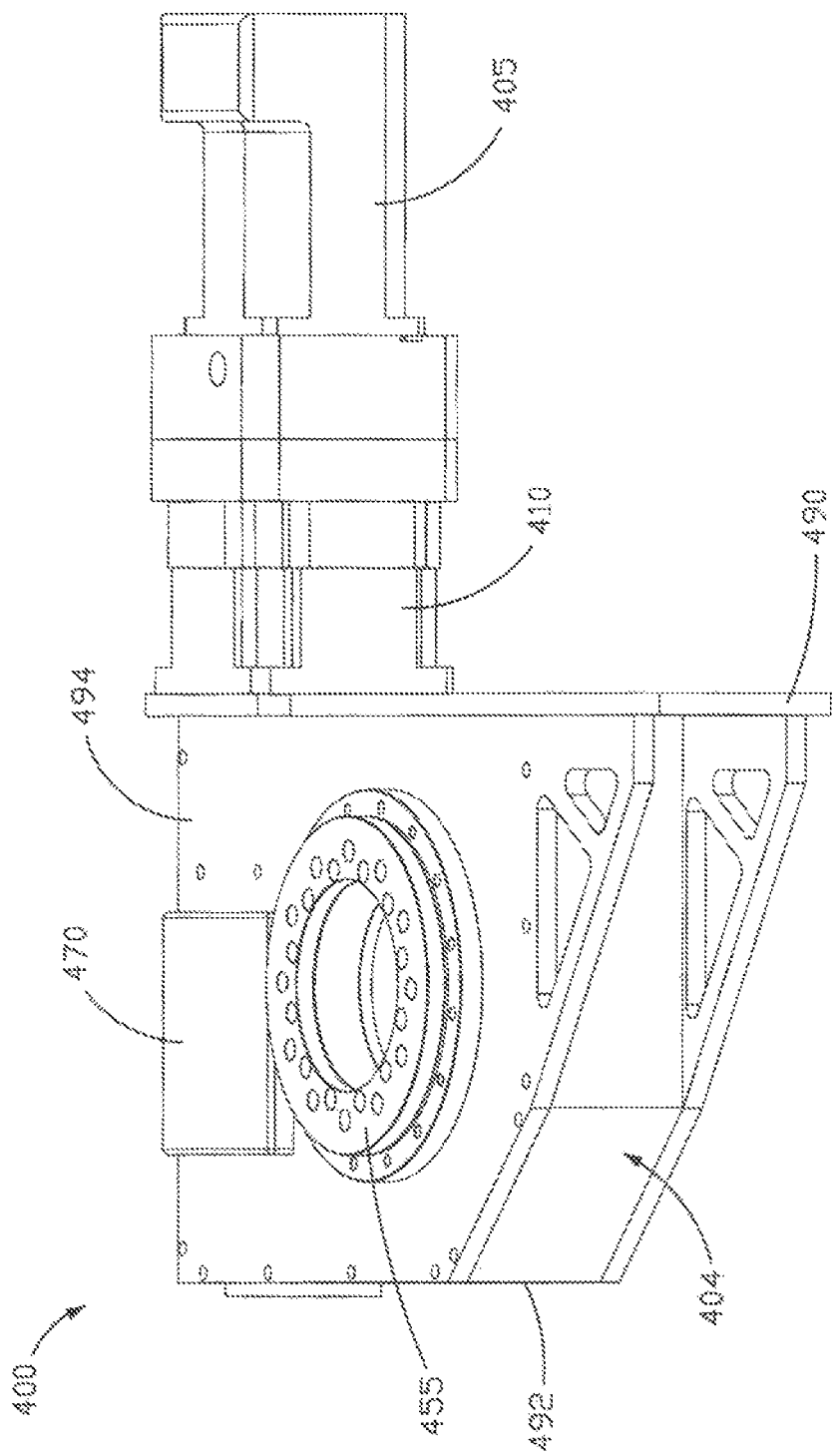

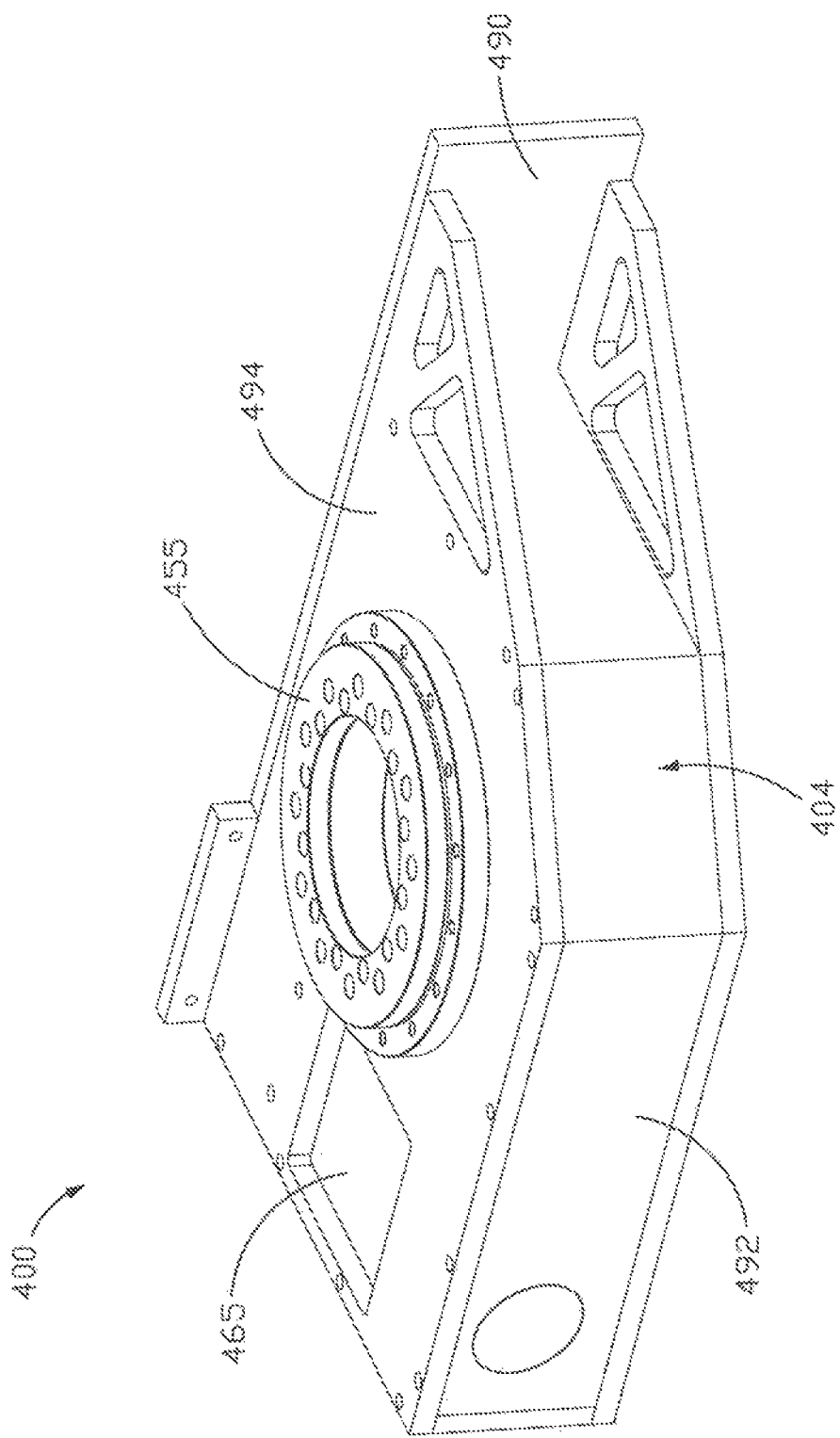

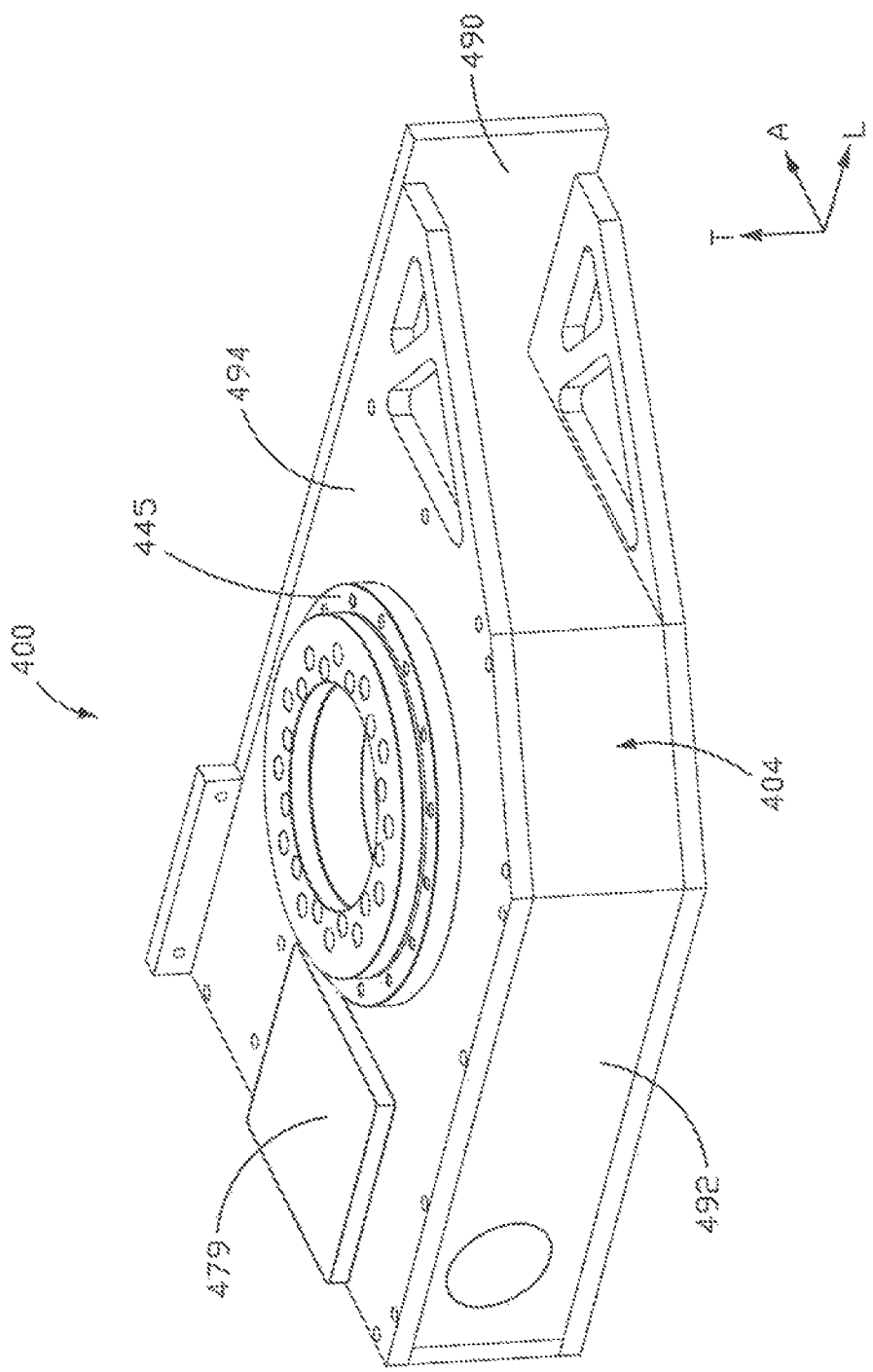

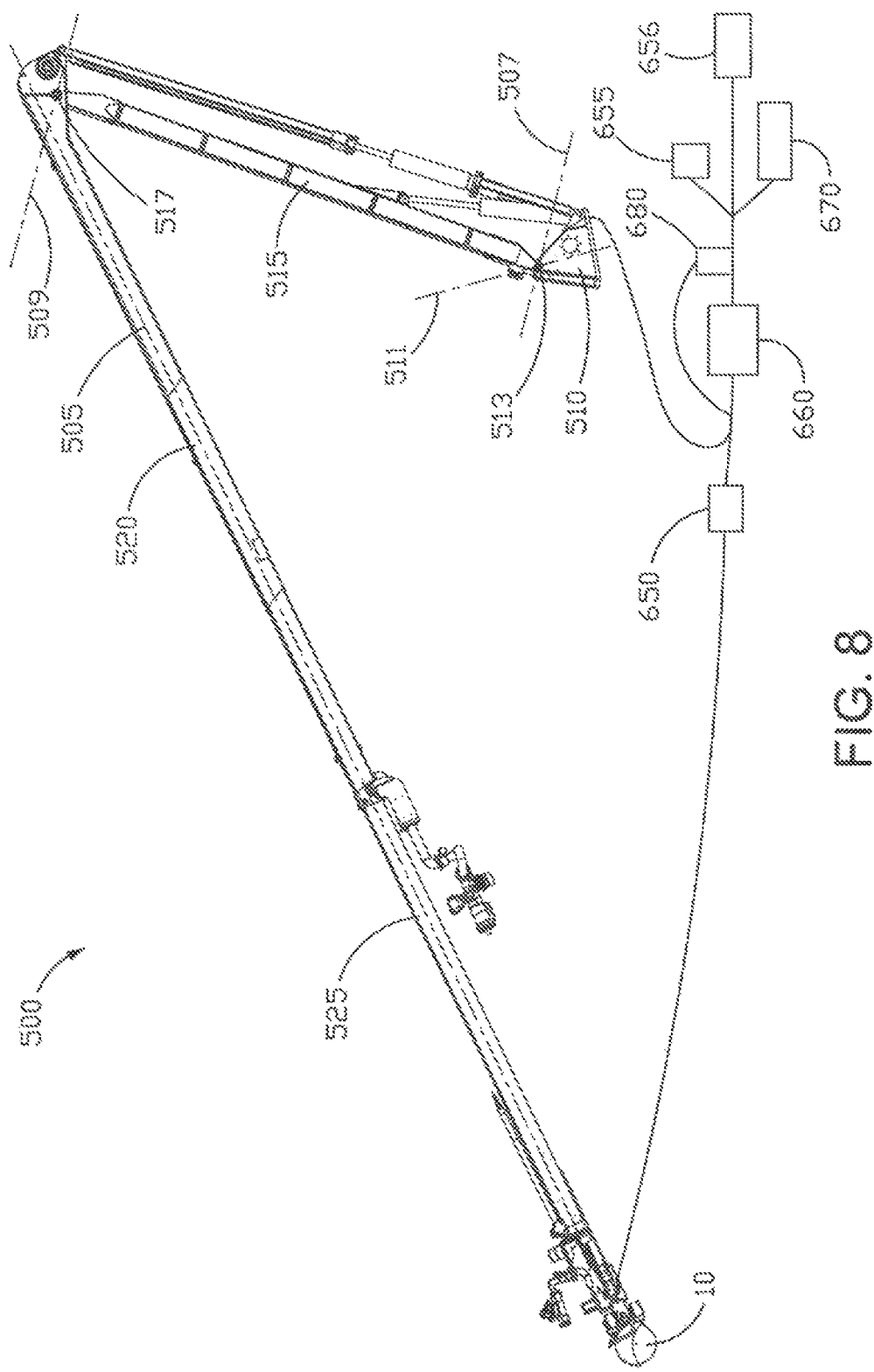

US 9,910,414 B2

SEMI-AUTONOMOUS RESCUE APPARATUS

CROSS-REFERENCE TO RELATED APPLICATIONS

This application is the National Stage of International Application No. PCT/US2012/036893, filed May 8, 2012, which claims the benefit of U.S. Provisional Application No. 61/484,217, filed May 9, 2011, U.S. Provisional Application No. 61/486,585, filed May 16, 2011, and U.S. Provisional Application No. 61/489,908, filed May 25, 2011, the disclosures of which are incorporated herein by reference in their entireties.

BACKGROUND

Conventional high reaching extendible turrets (HRETs) have been implemented to assist in emergency conditions, such as to fight fires. Typically, these devices include water or foam nozzles that are configured to spray water or foam onto the fire to thereby douse the fire. These devices may include a piercing nozzle that is configured to pierce a small hole in a structure so that water or foam may be sprayed through the hole to extinguish fires internal to the structure.

In addition to the use of HRETs, firefighters may use hand-held saws to cut access openings in the aircrafts or buildings that are on fire to enable first responders to rescue occupants and equipment. Hand-held saws can be used to create much larger holes in such structures than piercing nozzles. However, this approach has limitations as it is often difficult for a single firefighter to precisely cut out an access door in the aircraft fuselage or building while holding a heavy saw and wearing firefighting gear, and at the same time negotiating the heat, smoke, and flame associated with fires. In addition, because the range of motion is limited on the ladder, a firefighter may have to reposition the ladder several times to be able to cut the access panel and cut the access opening. Therefore, creating an access opening in a structure under emergency conditions with hand-held saws is not only dangerous but is also time consuming.

SUMMARY

A cutting device configured to attach to a boom arm is disclosed. The cutting device may include a saw assembly, a motor assembly coupled to the saw assembly, and a control system operatively coupled to the motor assembly. The saw assembly including a cutting portion configured to cut into a target surface. The motor assembly including a first motor configured to rotate the saw assembly about a first axis, a second motor configured to rotate the saw assembly about a second axis, and a third motor configured to rotate the saw assembly about a third axis. The control system is configured to actuate the first, second, and third motors to thereby rotate the saw assembly about the first, second, and third axes.

In another embodiment, the cutting device may include a saw assembly, a motor assembly coupled to the saw assembly, and a control system operatively coupled to the motor assembly. The saw assembly may include a cutting portion configured to cut into a target surface. The motor assembly may include at least two motors configured to rotate the saw assembly about two different axes. The control system may include at least two sensors mounting on the saw assembly, and may be configured to position the saw assembly to cut a target surface based on feedback from the at least two sensors.

Also disclosed is a semi-autonomous rescue system comprising a cutting device mounted to a high reaching extendible turret. The cutting device may include a saw assembly, a motor assembly coupled to the saw assembly, and a control system operatively coupled to the motor assembly and the high reaching extendible turret. The saw assembly may include a cutting portion configured to cut into a target surface. The control system may be configured to manipulate movement of the saw assembly along at least seven axes through actuation of the high reaching extendible turret and the motor assembly.

BRIEF DESCRIPTION OF THE DRAWINGS

The foregoing summary, as well as the following detailed description of a preferred embodiment of the application, will be better understood when read in conjunction with the appended drawings. For the purposes of illustrating the semi-autonomous rescue system and related subsystems of the present application, there is shown in the drawings a preferred embodiment. It should be understood, however, that the application is not limited to the precise arrangements and systems shown. In the drawings:

FIG. 2B is a left side view of the cutting device shown in FIG. 2A;

FIG. 2F is a left side view of the cutting device rotated about the first axis such that the blade of the cutting device is facing the right side;

FIG. 2G is a left side view of the cutting device rotated about a third axis such that the blade of the of the cutting device is moving horizontally right relative to the boom arm;

FIG. 2H is a left side view of the cutting device rotated about the third axis such that the blade of the cutting device is moving horizontally left relative to the boom arm;

FIG. 2I is a front perspective view of the cutting device rotated about a second axis such that the blade of the cutting device is moving vertically down relative to the boom arm;

FIG. 3C is an exploded view of the saw assembly shown in FIG. 3A;

FIG. 4B is an exploded view of the mechanical arm portion shown in FIG. 4A;

FIG. 7B is a right perspective view of the rotating platform portion shown in FIG. 7A;

FIG. 7E is a perspective view of the rotating platform shown in 7A with a cover plate removed;

FIG. 7F is a perspective view of the rotating platform shown in FIG. 7E with the cover plate attached; and FIG. 8 is a perspective view showing a control system for controlling the cutting device and boom arm.

DETAILED DESCRIPTION

Figure 1:
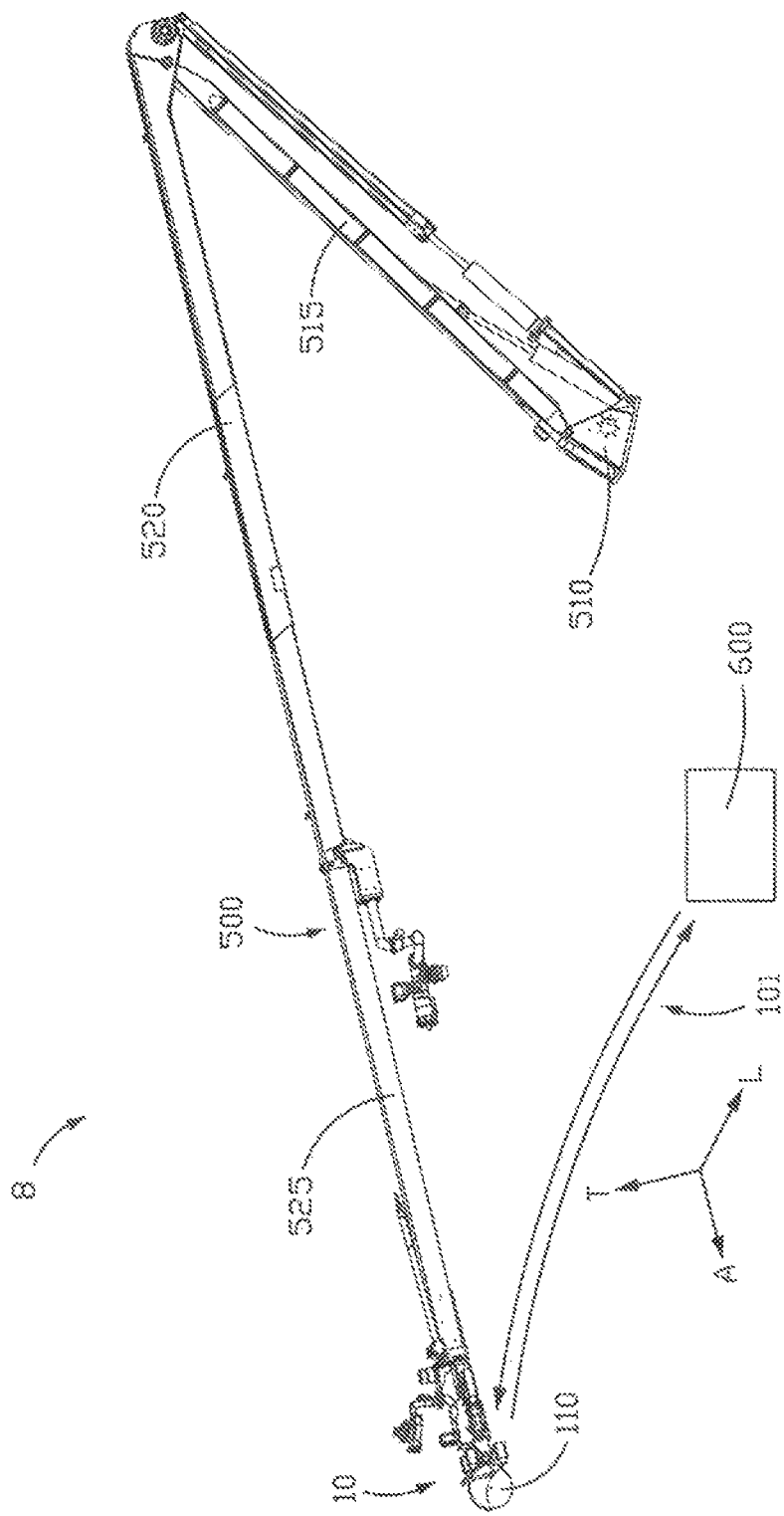
FIG. 1 is a perspective view of a semi-autonomous rescue system according to an embodiment of the invention, the rescue system including a cutting device that is attached to a boom arm.

Referring to FIG. 1, a semi-autonomous rescue system 8 includes a boom arm 500 and a cutting device 10 that is attached to the boom arm 500. The boom arm 500 is illustrated as a high reach extendable turret (HRET) that is capable of being mounted on a vehicle such as a fire truck. The rescue system 8 is configured such that the cutting device 10 can be operated remotely so as to allow an operator to cut an access opening into a structure (i.e. a building or an airplane) that is on fire, while keeping the operator a safe distance away from any dangers caused by the fire. The cutting device 10 may be permanently attached, or removably attached to the boom arm 500. While the boom arm 500 is illustrated as an HRET, it should be understood that the boom arm 500 may include any structure having multiple, such as three, degrees of freedom of movement.

As shown in FIGS. 2A-2D, the cutting device 10 includes a saw assembly 100 having a cutting portion 110 that includes a blade 112, and a motor assembly 154 that is coupled between the saw assembly 100 and the boom arm 500. The motor assembly 154 is operatively coupled to the saw assembly 100 and configured to rotate at least a portion of the saw assembly 100 so that the cutting portion 110 of the saw assembly 100 can be oriented at different angles and positions relative to a surface of a structure that is to be cut. For instance, referring to FIG. 3A, the saw assembly 100 can include a linkage 131 that couples the blade 112 to the motor assembly 154. The linkage 131 can include a mounting bracket 130 that is mounted to the motor assembly 154, and a support arm 133 that is connected between mounting bracket 130 and the blade 112. The saw assembly 100 can further include a protective cover 115 that can encapsulate a portion of the blade 112 such that the blade 112 is configured to rotate about the support arm 133 with respect to the cover 115. The motor assembly 154 includes a mechanical arm 200, a sweep gearbox 300, and a rotating platform 400, that are each configured to rotate the saw assembly 100 about an axis. Accordingly, the motor assembly 154 is configured to rotate the saw assembly 100 about three axes, thereby imparting three degrees of freedom of movement of the saw assembly 100 relative to the boom arm 500.

It will thus be appreciated that the rescue system 8 is configured to import motion to the saw assembly 100 about a horizontal longitudinal direction A (e.g., forward and rearward), a horizontal lateral direction L that is substantially perpendicular to the longitudinal direction A, and a vertical transverse direction T that is substantially perpendicular to the longitudinal direction A and the lateral direction L. The saw assembly 100 extends along a first or X direction, a second or Y direction that is substantially perpendicular to the X direction, and a third or Z direction that is substantially perpendicular to the X and Y directions. The saw assembly 100 defines a proximal end P and a distal end D that is opposite the proximal end P and spaced from the proximal end P along the X direction. As illustrated in FIG. 2B, the rescue system 8 is configured to assume a neutral position whereby the X direction is parallel to the longitudinal direction A, the Z direction is parallel to the lateral direction L, and the Y direction is parallel to the transverse direction T, and is further configured to assume an articulated position whereby at least one up to all of the X, Y, and Z directions is angularly offset with respect to the longitudinal, transverse, and lateral directions, respectively.

The saw assembly 100 includes a cutting blade 112 that extends along a plane $P_B$ (see FIG. 2A) defined by the X and Y directions, and rotates about an axis substantially parallel to the Z direction. The blade 112 of the saw assembly 100 may be positioned relative to a target location, such as a target surface, to be cut, and the rescue system 8 is configured to move the blade 112 along a cutting path at least partially defined by at least one or more, up to all, of the lateral direction L, the transverse direction T, and the longitudinal direction A.

Referring to FIGS. 2E-H, the motor assembly 154 is configured to rotate the saw assembly 100 about at least one, such as three axes, including a first axis that is parallel to the X direction, a third axis that is parallel to the Y direction, and a second axis that is parallel to the Z direction. It should be appreciated that while the motor assembly 154 is illustrated as including rotating members that include motors configured to drive the saw assembly 100 to rotate along the respective at least one axis, the motors can be located remote from the cutting device 10, as desired. Thus, the motor assembly 154 can also be referred to as an articulation assembly configured to articulate the saw assembly along any direction or combination of directions X, Y, and Z, as desired.

Figure 2A:
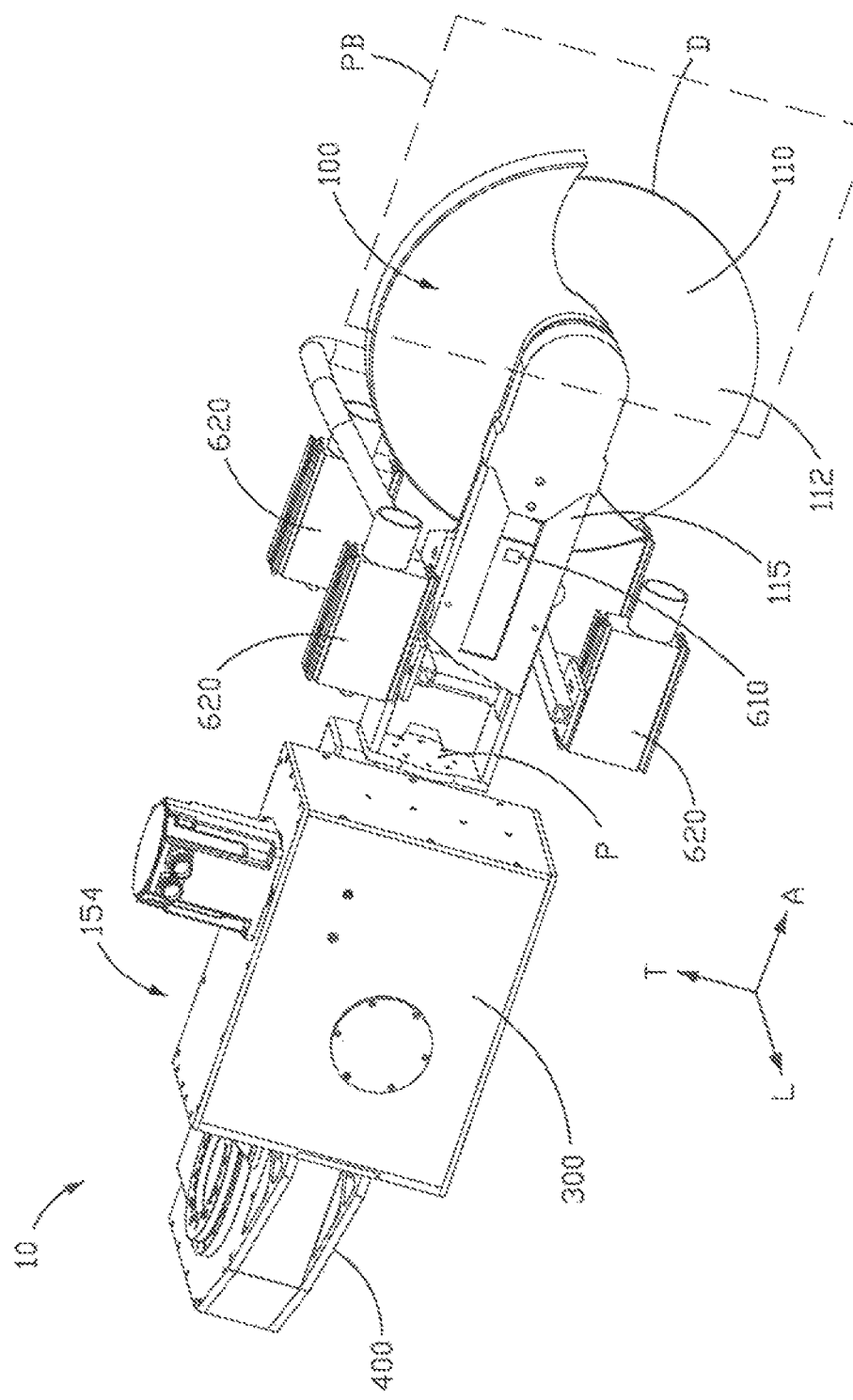
FIG. 2A is a right side perspective view of a cutting device according to an embodiment of the invention, the cutting device including a saw assembly, and a motor assembly configured to rotate the saw assembly about three axes, the motor assembly including a mechanical arm, a sweep gearbox, and a rotating platform.
Figure 2C:
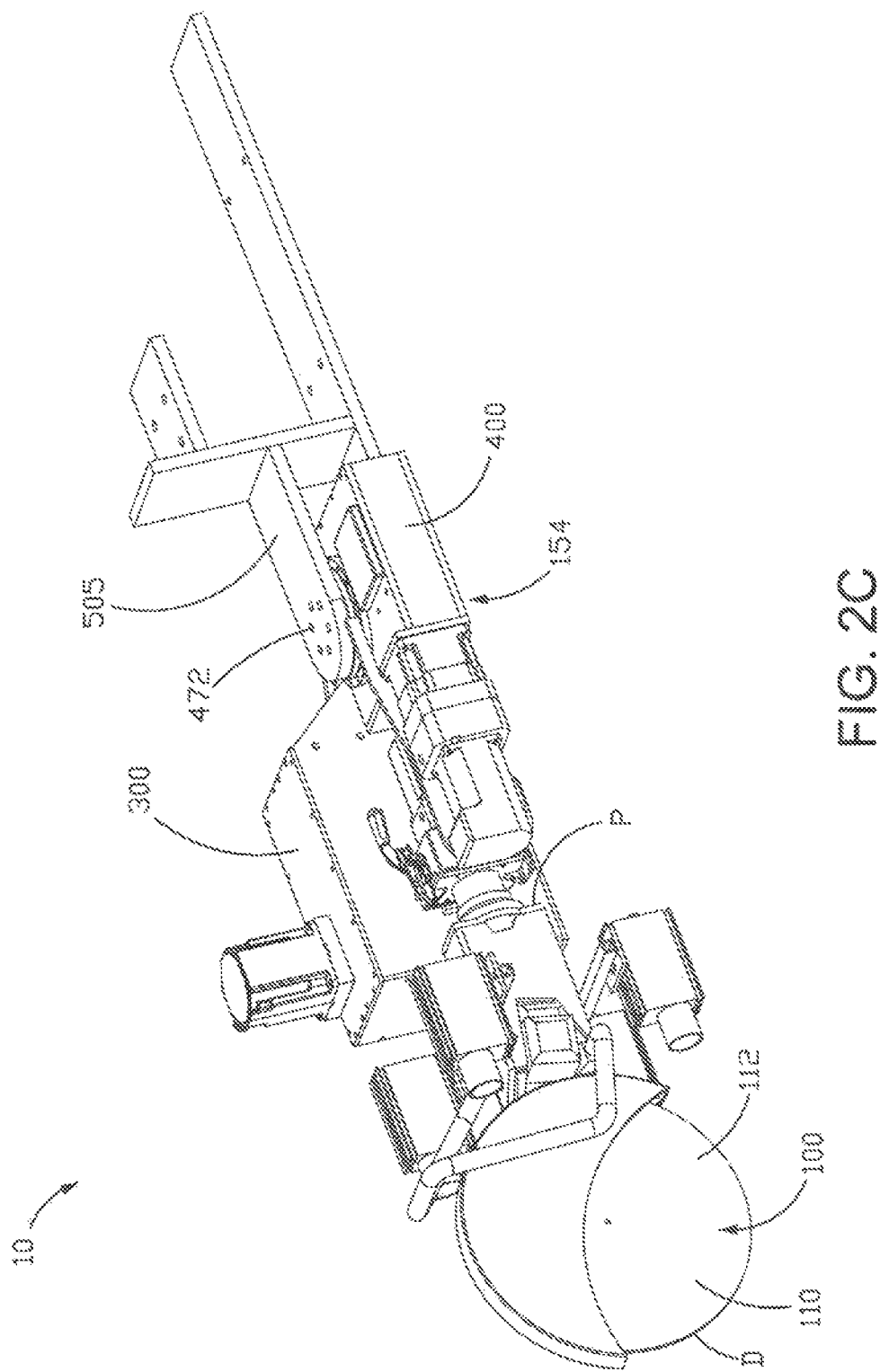
FIG. 2C is a left side perspective view of the cutting device shown in FIG. 2A.
Figure 2D:
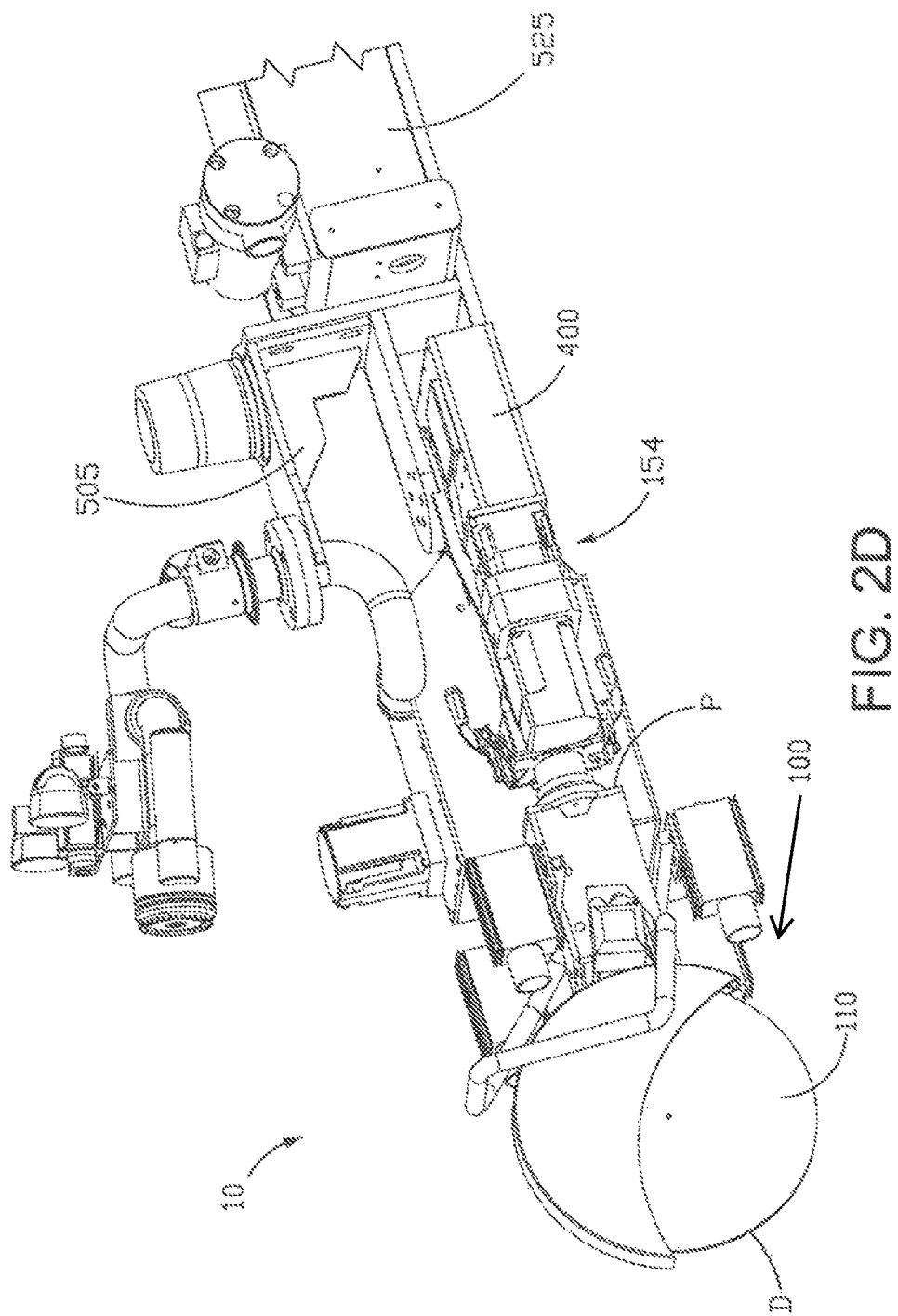
FIG. 2D is a left side perspective view of the cutting device shown in FIG. 2A attached to a boom arm.
Figure 2E:
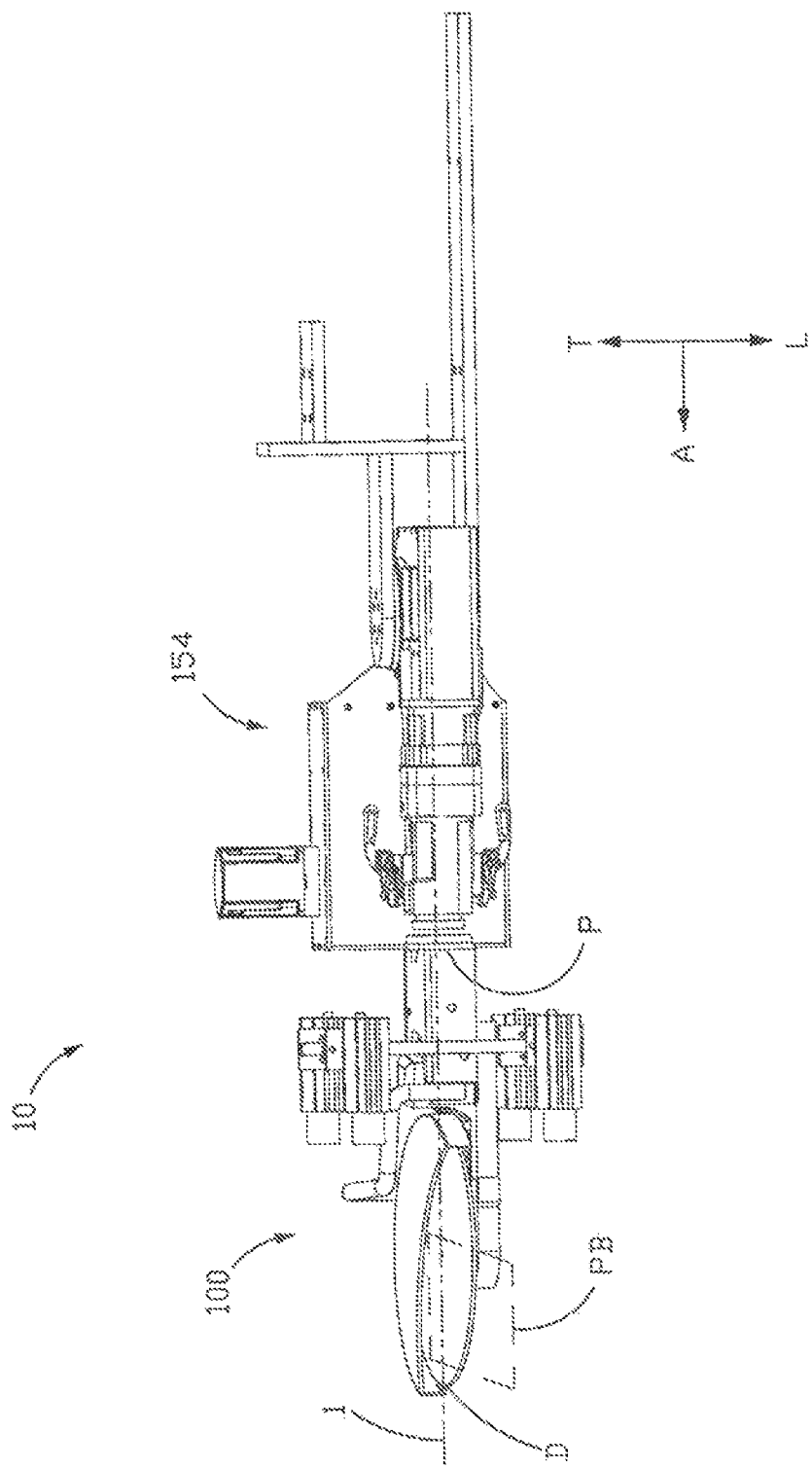
FIG. 2E is a left side view of the cutting device rotated about a first axis such that a blade of the cutting device is facing the left side.
Figure 2J:
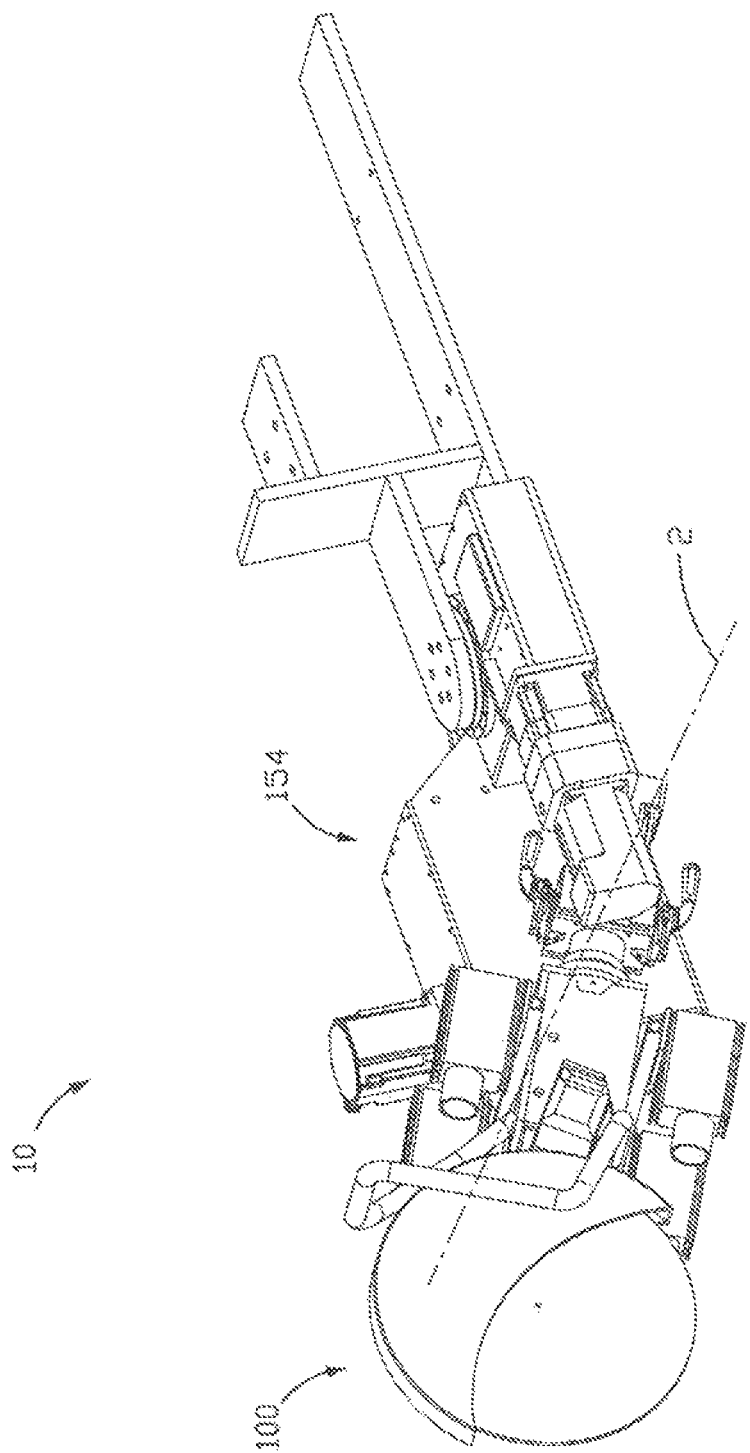
FIG. 2J is a front perspective view of the cutting device rotated about the second axis such that the blade of the cutting device is moving vertically up relative to the boom arm.

As illustrated in FIGS. 2E-F, the motor assembly 154 includes a first rotating member, illustrated as a mechanical arm 200, that is configured to rotate the saw assembly 100 to about a first axis that extends along the X direction. Accordingly, the motor assembly 154 is configured to rotate the saw assembly 100 to position the plane $P_B$ of the blade 112 at any desired angle (including zero) with respect to at least one or both of the lateral L and transverse T directions. As illustrated in FIGS. 2G-2H, the motor assembly 154 includes a second rotating member, such as a rotating platform 400, that is configured to rotate the saw assembly 100 about a third axis that is parallel to the Y direction. Therefore, for instance when the blade 112 is oriented such that the plane $P_B$ is defined by the longitudinal A and lateral L directions, rotation of the saw assembly about the third axis sweeps the blade 112 horizontally. As illustrated in FIGS. 2I-J, the motor assembly 154 includes a third rotating member, such as the sweep gearbox 300, that is configured to rotate the saw assembly 100 about a second axis that is parallel to the Z direction. Therefore, for instance, when the blade 112 is oriented such that the plane $P_B$ is defined by the longitudinal A and transverse T directions, rotation of the saw assembly 100 about the second axis sweeps the blade 112 vertically.

As described above, it should be appreciated that first rotating member is configured to orientate the plane $P_B$ of the cutting blade 112 any angle as desired with respect to the transverse T and lateral L directions. Accordingly, the second and third rotating members can be actuated simultaneously so as to sweep the blade 112 along a direction parallel to the orientation of the plane $P_B$, when the plane $P_B$ is oriented at a non-zero angle with respect to the lateral L and transverse T directions. When the plane $P_B$ is defined by the lateral L and longitudinal A directions, the second rotating member alone can sweep the blade 112 along a direction parallel to the orientation of the blade (for instance, the lateral direction L). When the plane $P_B$ is defined by the transverse T and longitudinal A directions, the third rotating member alone can sweep the blade 112 along a direction parallel to the orientation of the blade (for instance, the transverse direction T).

Referring again to FIG. 1, the rescue system 8 can include a control system 600 operatively coupled to the motor assembly via pathways 101. The control system 600 is configured to receive signals that indicate a position of the saw assembly 100 relative to the target surface to be cut, and is further configured to send control signals that drive at least one or more, up to all, of the first, second, and third rotating members of the motor assembly 154. The control system 600 can be positioned remote from the cutting device 10, for instance from the cabin of the truck to which the boom arm 500 is mounted, or can be located on-board with the cutting device 10.

As shown in FIG. 2A, the control system 600 may include a sensor, which in one embodiment can be a Hall effect sensor 610, that is configured to determine the speed at which the saw blade 112 is rotating. The Hall effect sensor 610 can be coupled to the saw assembly 100 at any location as desired. The Hall effect sensor 610 includes a magnet which is attached to a pulley of the cutting portion 110 that rotates along with the blade 112, and can be positioned underneath the cover 115 (for instance between the cover 115 and the blade 112). The Hall effect sensor 610 can further include a Hall probe that is mounted to the saw assembly 100, for instance at the support arm 133, such that as the saw blade spins, the pulley and thus the magnet will spin at a relative rate to the saw blade. The Hall probe is aligned with the magnet and thus configured to sense the number of times that the magnet passes. The control system 600 is configured to correlate the number of passes of the magnet to the number of revolutions per minute of the blade 112. In conjunction with other aspects of the control system 600 that will be described below, the Hall effect sensor 610 is used to monitor cutting speed so that the cutting portion 110 maintains a consistent cutting speed and depth. For instance, if the blade 112 is pinched in the target location, the actual cutting speed of the blade may decrease below a desired cutting speed.

Figure 3A:
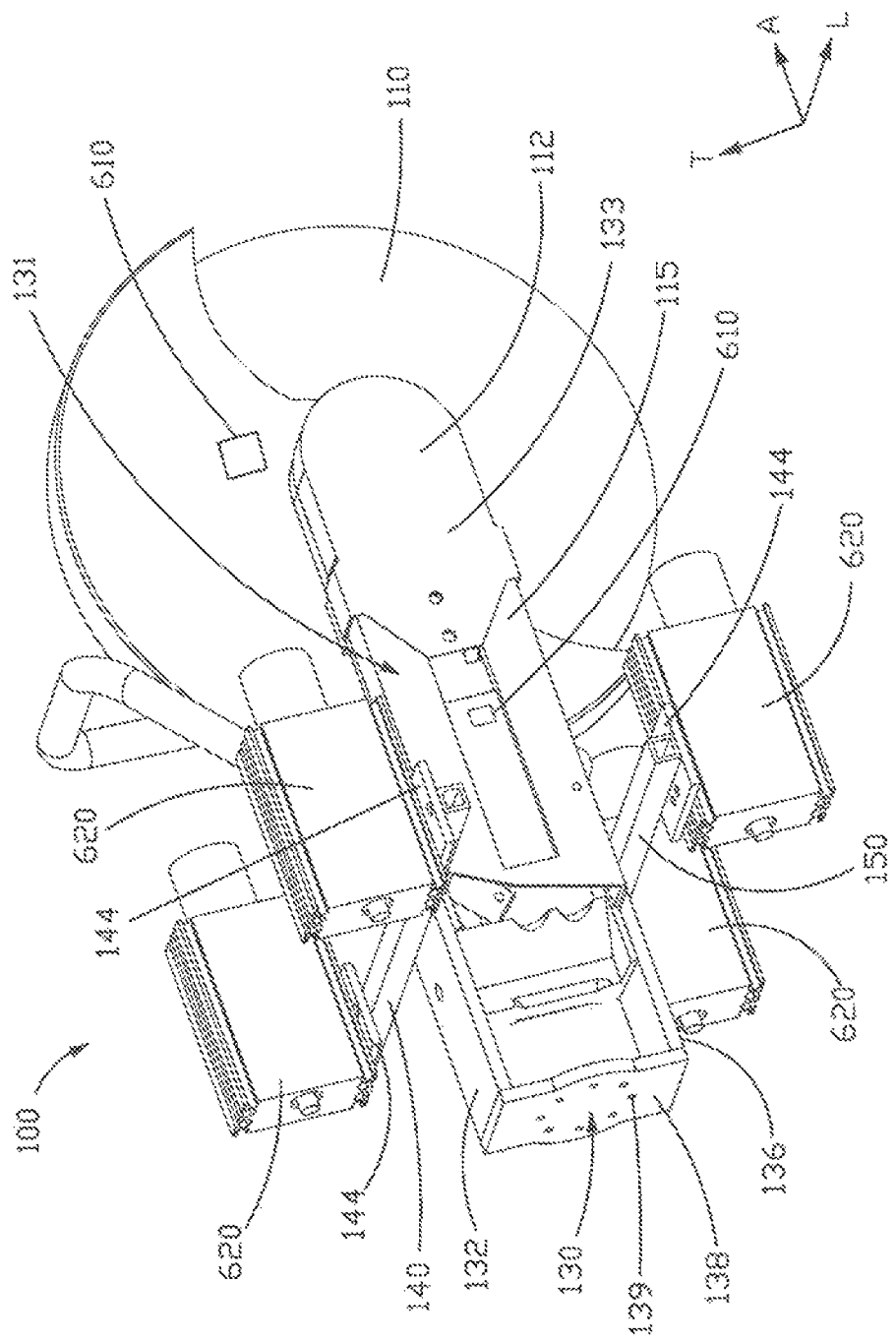
FIG. 3A is a perspective view of the saw assembly of the cutting device shown in FIG. 2A.
Figure 3B:
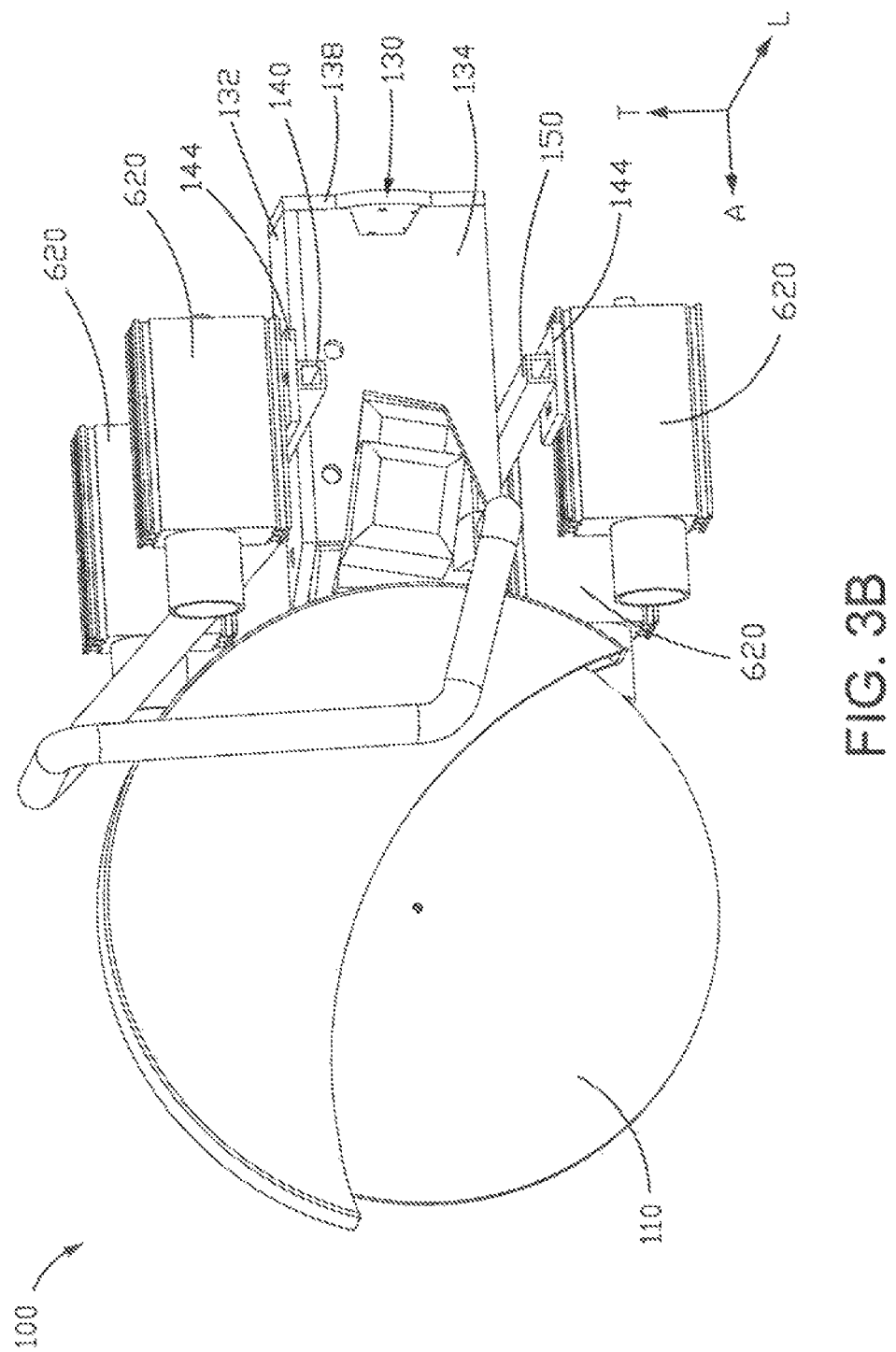
FIG. 3B is a left side view of the saw assembly shown in FIG. 3A.

As shown in FIGS. 3A-3C, the mounting bracket 130 that is configured to mount the saw assembly 100 to the mechanical arm 200. The saw assembly 100 further includes at least one sensor mount, such as first and second sensor mounts 140 and 150 that are coupled to the mounting bracket 130.

The mounting bracket 130 may be custom designed to fit the rear end of an off-the-shelf hydraulic power saw and may include a top portion 132, a side portion 134, and a bottom portion 136 that are coupled together so as to define a C-shaped beam. As shown the mounting bracket 130 further includes a back portion 138 that is coupled to a proximal end of the top, side, and bottom portions 132, 134, and 136. The back portion 138 defines a series of holes 139 that are configured to receive fixation elements such as bolts so as to mount the saw assembly 100 to a flange 205 on the mechanical arm 200. The mounting bracket 130 may be made from any desired material such as machined aluminum.

In the illustrative embodiment, the saw assembly 100 includes a Husqvarna K2500 hydraulic power saw retrofitted with the mounting bracket 130. The Husqvarna K2500 hydraulic saw may be purchased from Construction Equipment Plus, a division of CSN Stores LLC located in Boston, Mass. It should be understood, however, that the saw assembly 100 may include an electric or gas powered circular saw, milling type bit, reciprocating saw, water jet, chain saw, laser, or other cutting system with similar cutting capabilities.

As shown in FIG. 3A, the first sensor mount 140 is mounted to the top portion 132 of the mounting bracket 130 such that the first sensor mount 140 is elongate in the lateral direction L and extends laterally outward from the mounting bracket 130. Similarly, the second sensor mount 150 is mounted to the bottom portion 136 of the mounting bracket 130 such that the second sensor mount 150 is elongate in the lateral direction L and extends laterally outward from the mounting bracket 130. As best shown in FIG. 3C the first and second sensor mounts 140 and 150 each includes two couplers 144, for instance proximate to their respective outer ends, that are configured to couple to respective sensors as will now be described.

As shown in FIGS. 3A-3C, the control system 600 includes at least one, such as four, distance sensors 620 that may be mounted to the saw assembly 100. A first pair of distance sensors 620 can be mounted to the couplers 144 of the first sensor mount 140, and a second pair of distance sensors 620 can be mounted to the couplers 144 of the second sensor mount 150. The four distance sensors 620 can be mounted to the sensor mounts 140 and 150 such that they are all located within a single plane defined by the Y and the Z directions. For some applications, for instance when the target location is an airplane fuselage with windows, the control system 600 can include four sensors 620 because at any given position of the saw assembly 100, one of the four sensors may read inaccurately if directed at a window or other irregular surface. In other applications, the control system can include three distance sensors 620 depending on the nature of the cutting surface. In the illustrative embodiment, the distance sensors 620 are Micro Epsilon time of flight phase shift sensors model no. 7162007.002. This model may be purchased from Micro Epsilon located in Raleigh, N.C. It should be understood, however, that distance sensors 620 may include other configurations. For example, the control system 600 can include a three-dimensional scanner or displacement quantifying sensors in place of the illustrated laser distance sensors.

Figure 4A:
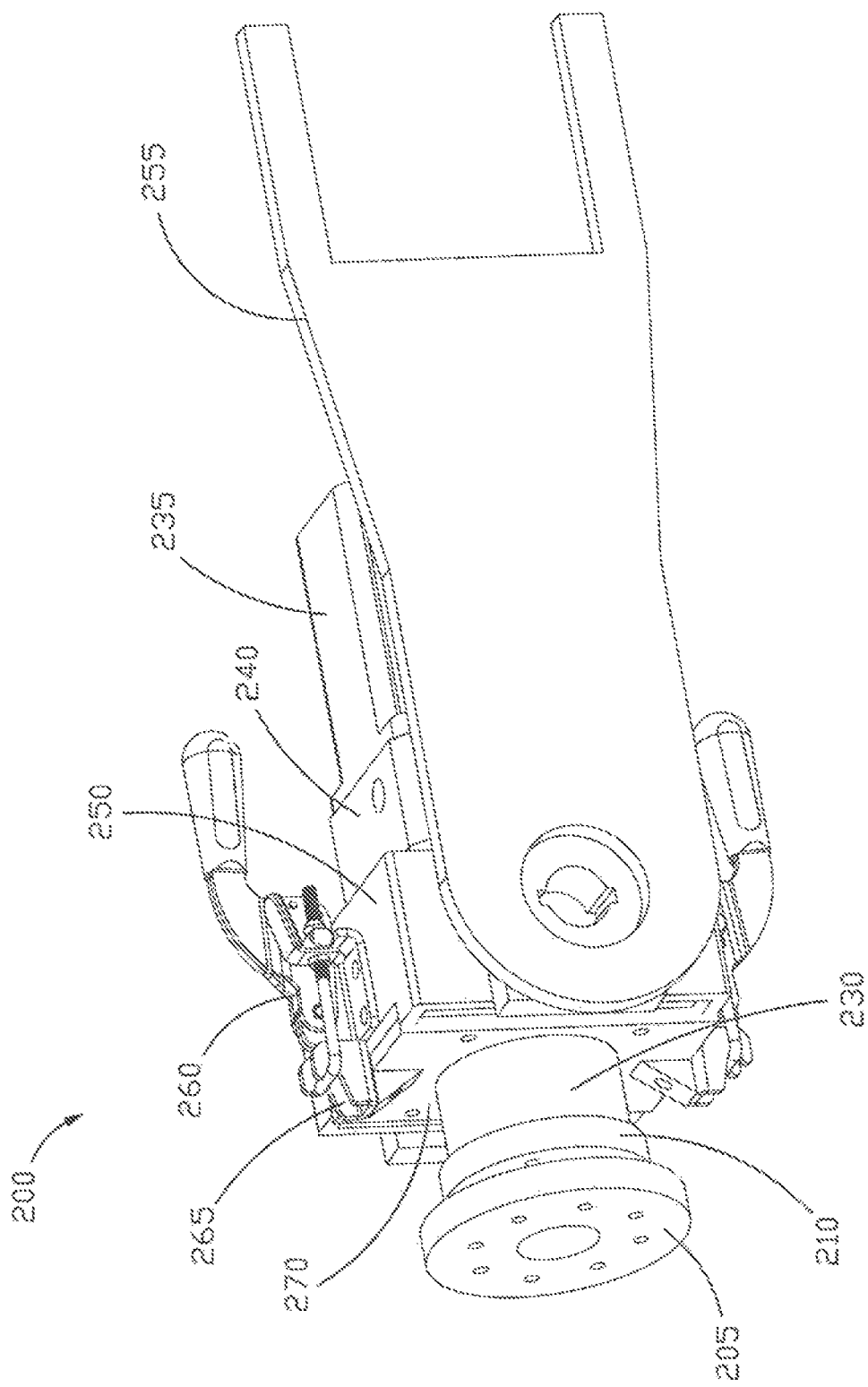
FIG. 4A is a perspective view of the mechanical arm portion of the motor assembly shown in FIG. 2A.

Now referring to FIGS. 2B, 4A and 4B, the mechanical arm 200 is configured to rotate the saw assembly 100 about the first axis. As shown in FIG. 4A, the mechanical arm 200 includes the attachment flange 205 reference above in relation to the saw assembly 100. The attachment flange 205 includes a plurality of holes 206. As shown in FIG. 2B, the mounting bracket 130 of the saw assembly 100 is coupled to the attachment flange 205 of the mechanical arm 200. In that regard, the holes 206 of the attachment flange 205 are configured to line up with the holes 139 of the mounting bracket 130. With the holes 139 and 206 in alignment, the saw assembly 100 can be bolted to the mechanical arm 200.

As shown in FIG. 4B, the mechanical arm 200 further includes a first or mechanical arm motor 235 and a first or mechanical arm gearbox 240 that are configured to drive or otherwise rotate the saw assembly 100 about the first axis. In particular, the attachment flange 205 is fixed on a distal side of a motor housing cover 210, which itself receives a shaft coupling 215. The shaft coupling 215, along with radial bearings 220 which straddle a collar 225 of the shaft coupling 215, are contained within a bearing housing 230. The shaft coupling 215 is the output shaft of the mechanical arm 200 and couple to the shaft of the mechanical arm gearbox 240. The output shaft of the mechanical arm 200 is driven by the mechanical arm motor 235 and the mechanical arm gearbox 240, to thereby rotate the saw assembly 100 about the first axis. As will be described, the mechanical arm motor 235 receives control signals from the control system 600 when a user requires the saw assembly 100 to be rotated about the first axis.

In the illustrative embodiment, the mechanical arm motor 235 is a Danaher Motion stepper motor model no. K31HCLG-LNK-NS-01, and the mechanical arm gearbox 240 is a Thomson Micron 4:1 gearbox, model mo. NT34-004. This motor and gear box may be purchased from G&G Technical, Inc. located in Paoli, Pa. It should be understood, however, that any mechanical arm motor 235 and any mechanical arm gearbox 240 may be used, as desired.

Figure 5A:
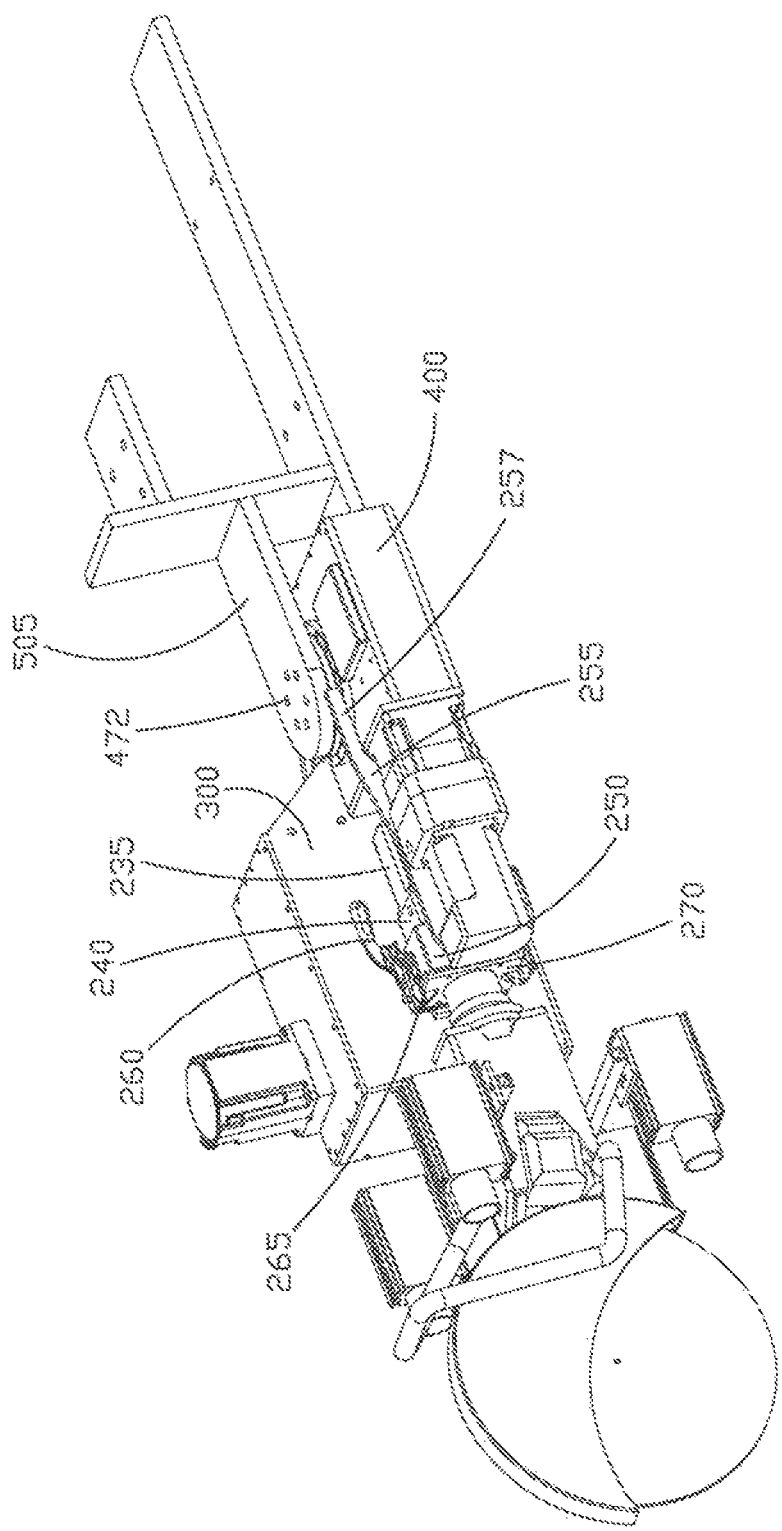
FIG. 5A is a perspective view of the saw assembly attached to the mechanical arm.
Figure 5B:
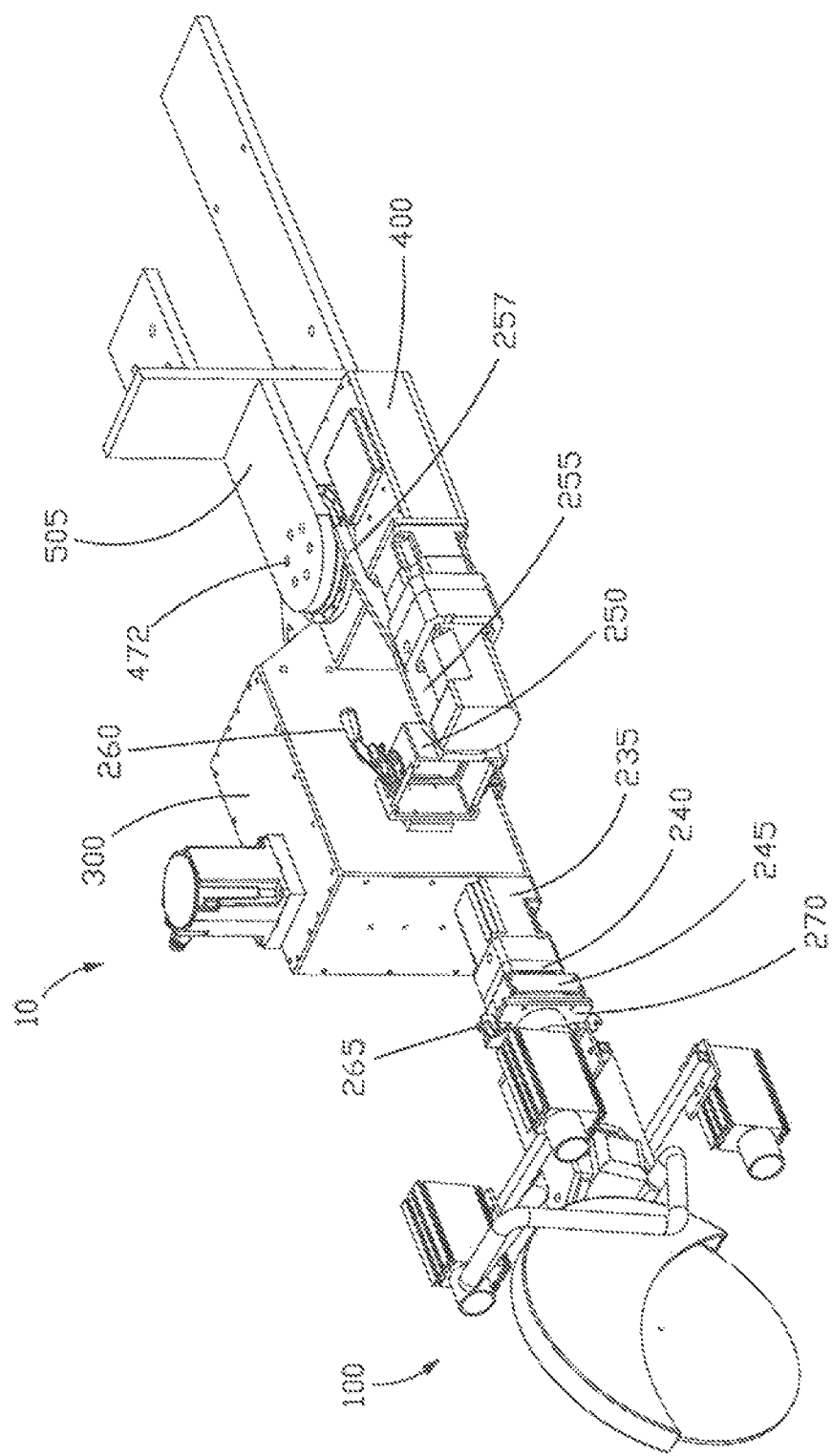
FIG. 5B is a perspective view of the saw assembly detached from the mechanical arm.

As shown in FIGS. 5A and 5B, the mechanical arm motor 235 and mechanical arm gearbox 240, along with the saw assembly 100 may be removably attached to the remainder of the cutting device 10. The saw assembly 100 can therefore be stored when not in use, potentially extending the useful life of the saw assembly 100. Such a configuration also reduces the weight and torque on the boom arm 500 when the saw assembly 100 is detached, thereby potentially minimizing wear on the boom arm 500. In this regard, and in reference to FIGS. 4B, 5A, and 5B, the mechanical arm gear box 240 may be mounted to a pair of motor mounts 245 that surround the body of the mechanical arm gearbox 240. The motor mounts 245 and thus the gearbox 240 may be releasably secured to a motor catch 250 by a pair of locking members 260 that are affixed to the motor catch 250. In the illustrated embodiment, the locking members 260 are toggle clamps that are configured to releasably hook into clamp hook mounts 265. The clamp hook mounts 265 are fixed to a mechanical arm front plate 270, which itself is fixed to the front of the mechanical arm gear box 240. In this way, the toggle clamps 260 and the clamp mount hooks 265 releasably couple the mechanical arm gear box 240 to the motor catch 250 which, as shown by FIGS. 5A and 5B, remains attached to the remainder of the cutting device 10.

As best shown in FIG. 4B, the mechanical arm front plate 270 may be two plates: a front plate 271, and a rear plate 272. The rear plate 272 is affixed directly to the mechanical arm gearbox 240, and the front plate 271 is affixed to the rear plate 272. The front plate 271 has cut out sections 273 so that the clamp hook mounts 265 are fixed to the rear plate 272. While the illustrated embodiment includes a mechanical arm front plate 270 having two plates, it should be understood that the mechanical arm front plate 270 may include a single plate.

With continued reference to FIGS. 4A and 4B, the motor catch 250 includes a first shaft support bracket 275 and an opposing second shaft support bracket 276 that are configured to support the motor catch 250 relative to a mechanical arm bracket 255 and the sweep gearbox 300. As shown in FIG. 4B the second shaft support bracket 276 fits into a circular aperture 281 defined by the mechanical arm bracket 255. Therefore, the shaft support bracket 276 is attached to the motor catch 250. A small shaft (not shown) on the shaft support bracket 276 may couple the motor catch 250 to a bearing on the mechanical arm bracket 255. Furthermore, the mechanical arm bracket 255 has a distal portion 256 that defines the circular aperture 281, and an opposing proximal portion 257 that defines a recess 259 that is configured to receive a housing of the rotating platform 400 for additional support.

Similarly, the first shaft support bracket 275 is configured to operatively couple the motor catch 250 to the sweep gearbox 300. In particular, the sweep gearbox 300 includes a housing 341 and a sweep gearbox output shaft 342 that is configured to couple to the first shaft support bracket 275 through a circular aperture on the housing 341. Rotation of the output shaft 342 will cause the saw assembly 100 to rotate about the second axis.

In that regard, and in reference to FIGS. 6A-6D, the sweep gearbox 300 includes a second or sweep gearbox motor 302 that is configured to drive the output shaft 342 of the sweep gearbox 300 to thereby rotate the saw assembly 100 about the second axis. As will be described, the control system 600 controls actuation of the sweep gear box motor 302. In the illustrative embodiment, the sweep gearbox motor 302 is a Kollmorgen servo motor model no. AKM51E-ACGNR-01. This motor may be purchased from G&G Technical, Inc. located in Paoli, Pa. Though it should be understood that the sweep gearbox motor 302 can be any motor as desired.

Figure 6A:
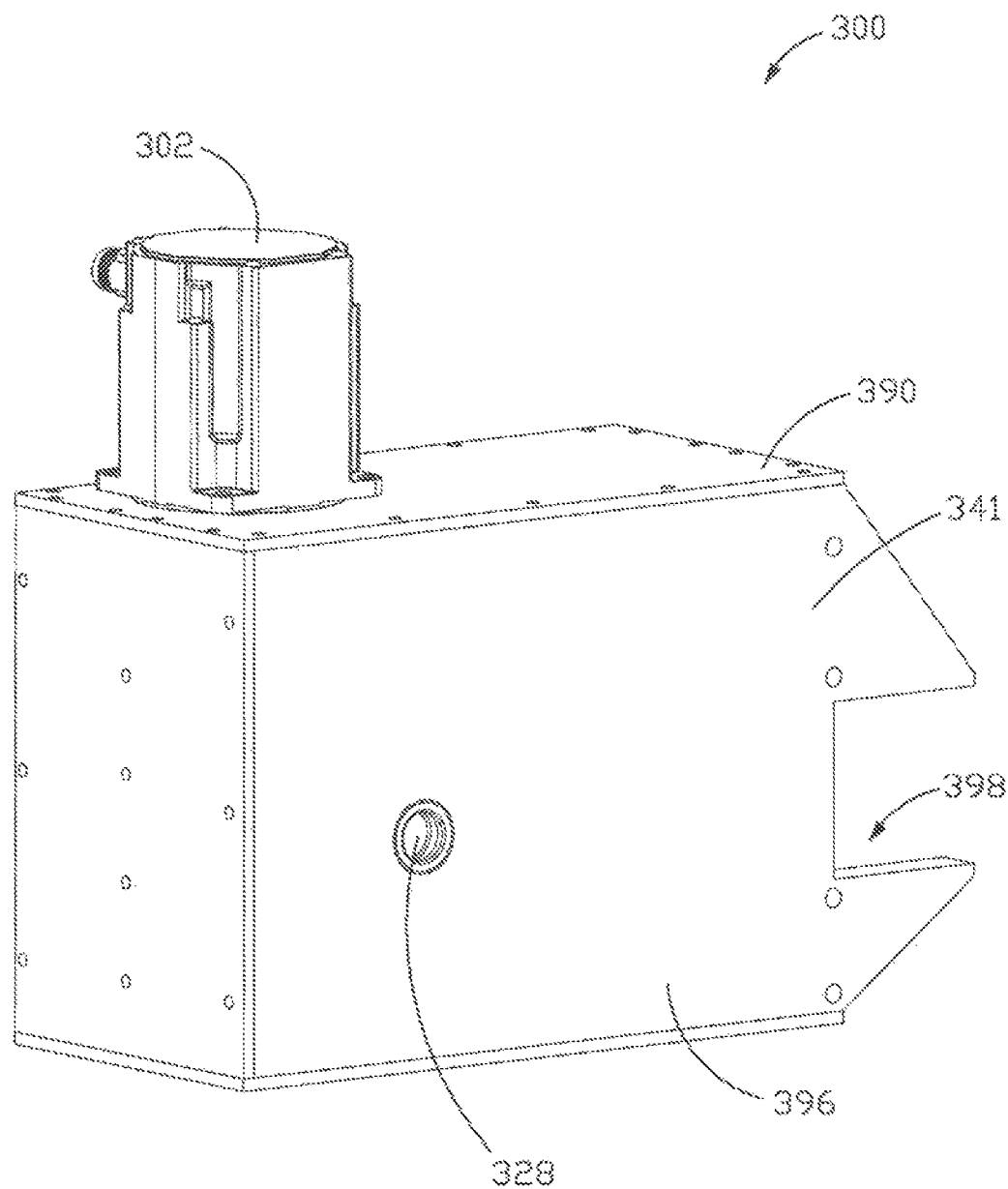
FIG. 6A is a left side perspective view of a sweep gearbox portion of the motor assembly shown in FIG. 2A.
Figure 6B:
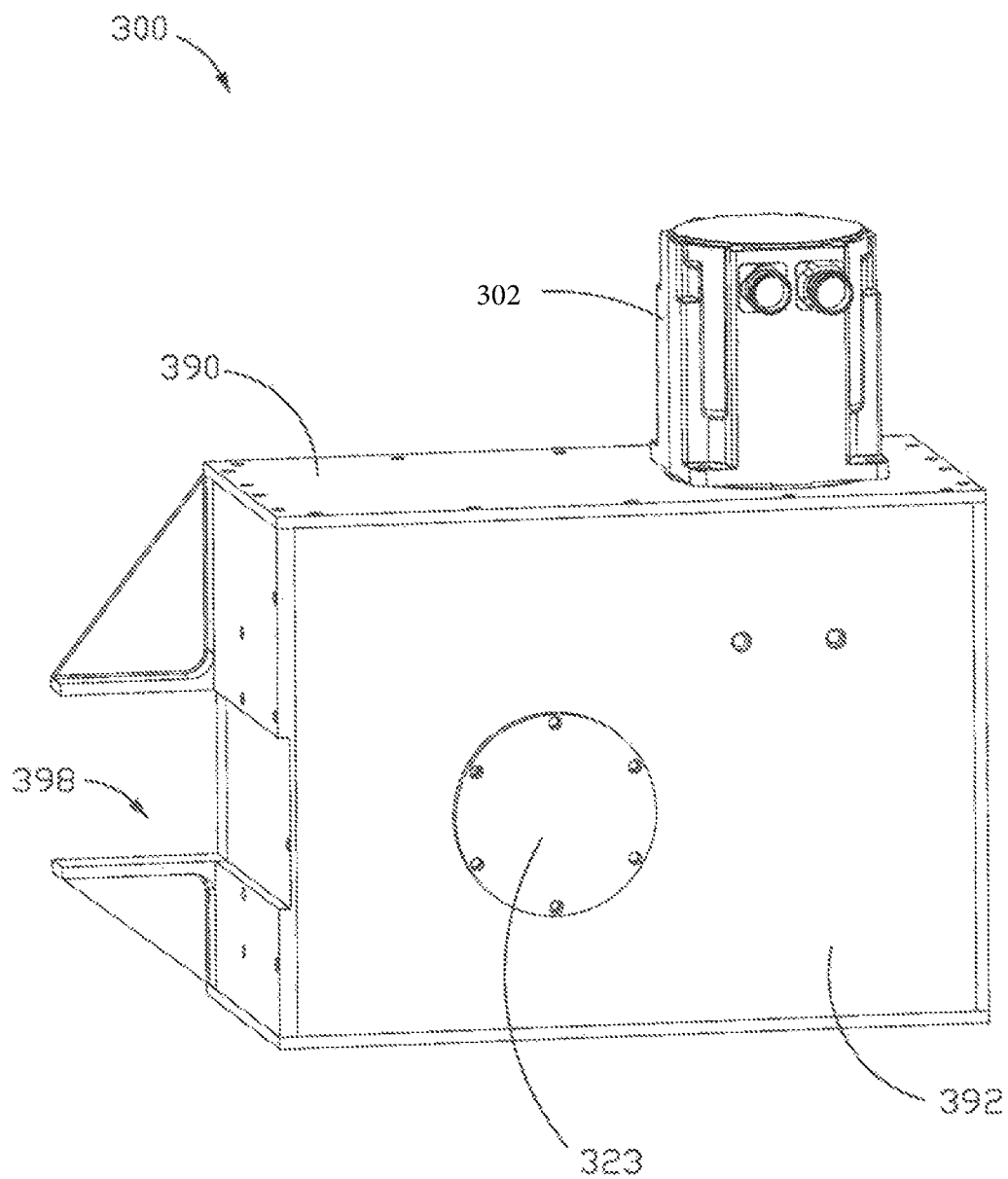
FIG. 6B is a right perspective view of the sweep gearbox shown in FIG. 6A.
Figure 6C:
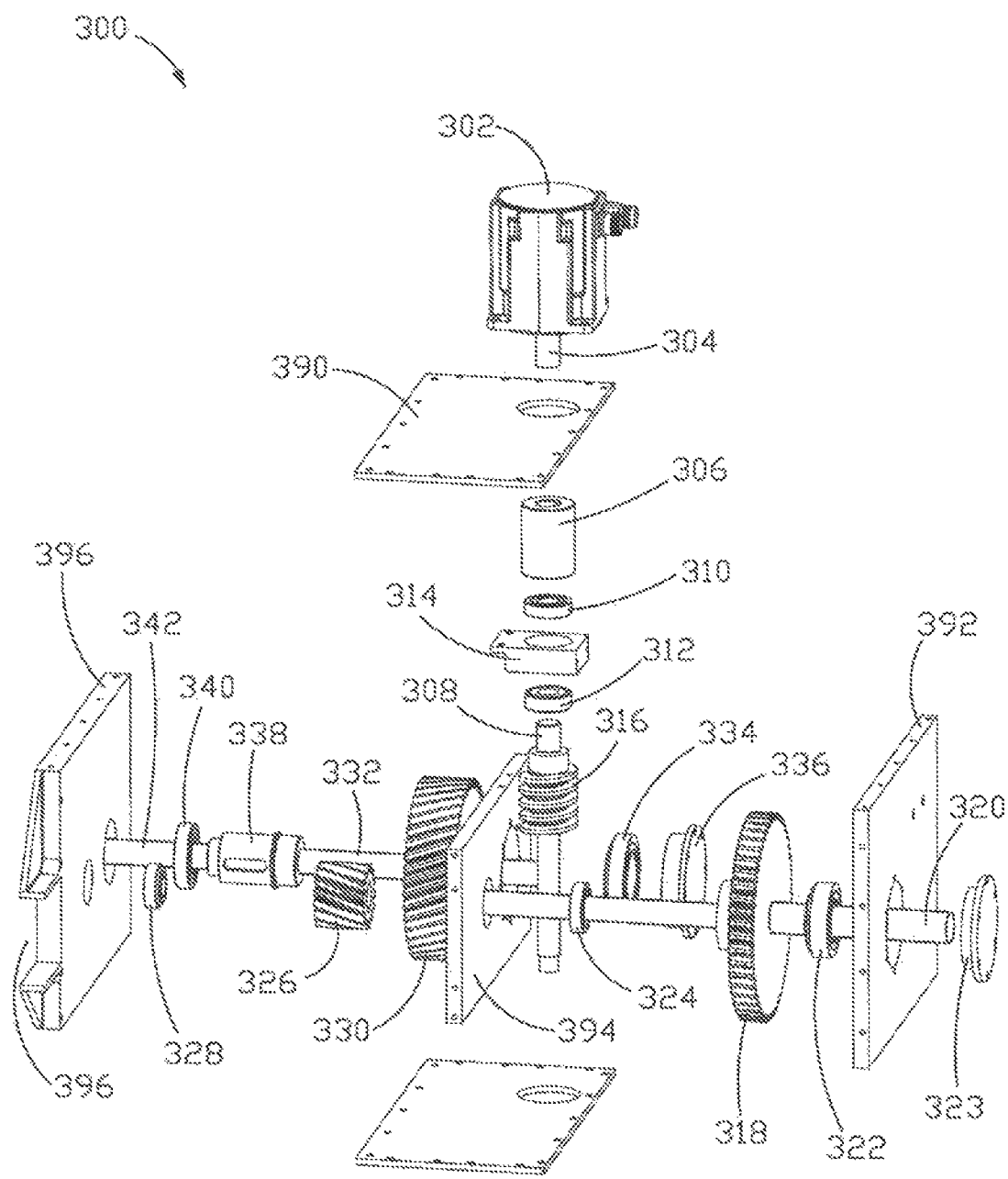
FIG. 6C is a top exploded view of the sweep gearbox shown in FIG. 6A.

As best shown in FIGS. 6A-6D, the sweep gearbox motor 302 is mounted to a top wall 390 of the sweep gearbox housing 341. The sweep gearbox motor 302 includes an output shaft 304 that extends through an aperture in the top wall 390 of the sweep gearbox housing 341 and into a shaft coupling 306. The shaft coupling 306 couples the sweep gearbox motor output shaft 304 with a vertical shaft 308. The vertical shaft 308 extends through a pair of radial and thrust bearings 310 and 312, respectively, that are located within a bearing housing 314, and terminates in a worm gear 316. The sweep gearbox motor 302 causes the vertical shaft 308 to rotate, thus causing the worm gear 316 to rotate. The worm gear 316 meshes with a worm gear pinion 318 so as to rotate the worm gear pinion 318. As shown in FIG. 6C, a first horizontal shaft 320 is coupled to the worm gear pinion 318 and rotates as the worm gear pinion 318 rotates. On one side of the worm gear pinion 318, the first horizontal shaft 320 extends through an aperture in a side wall 392 of the sweep gearbox housing 341 and terminates in a ball bearing 322 that is housed within an end cap 323. The end cap 323 is fixed to a side wall 392 of the sweep gearbox housing 341. On an opposing side of the worm gear pinion 318, the first horizontal shaft 320 extends through a radial bearing 324 which is housed within an aperture in a center wall 394 of the sweep gearbox housing 341. The first horizontal shaft 320 extends through the center wall 394 of the sweep gearbox housing 341, through a small helical gear 326, and terminates in a radial bearing 328 which is housed within an aperture in a side wall 396 of the sweep gearbox housing 341. The small helical gear 326 engages with a large helical gear 330 located in the same plane as the small helical gear 326.

Figure 6D:
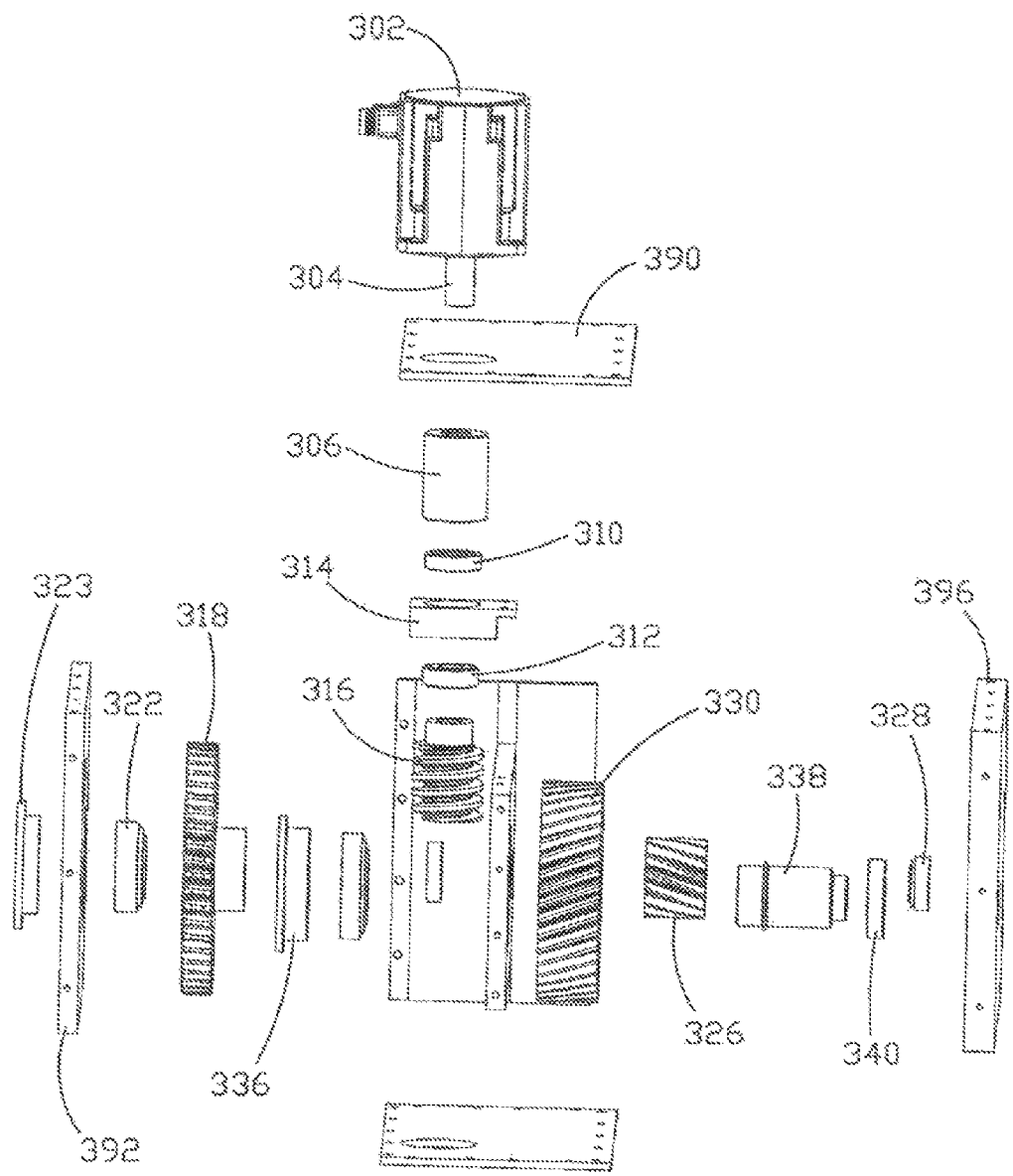
FIG. 6D is a side exploded view of the sweep gearbox shown in FIG. 6A.
Figure 7A:
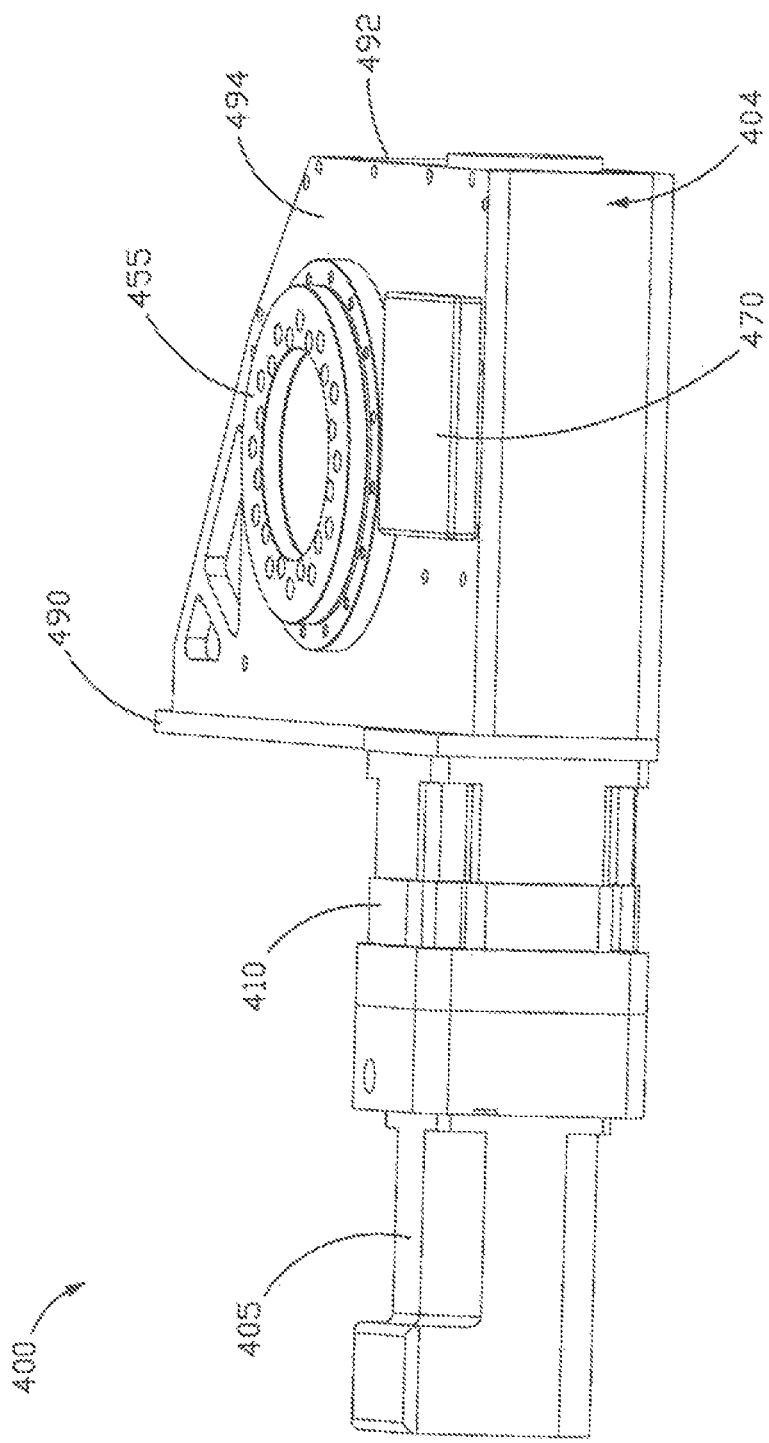
FIG. 7A is a left perspective view of the rotating platform portion of the motor assembly shown in FIG. 2A.
Figure 7C:
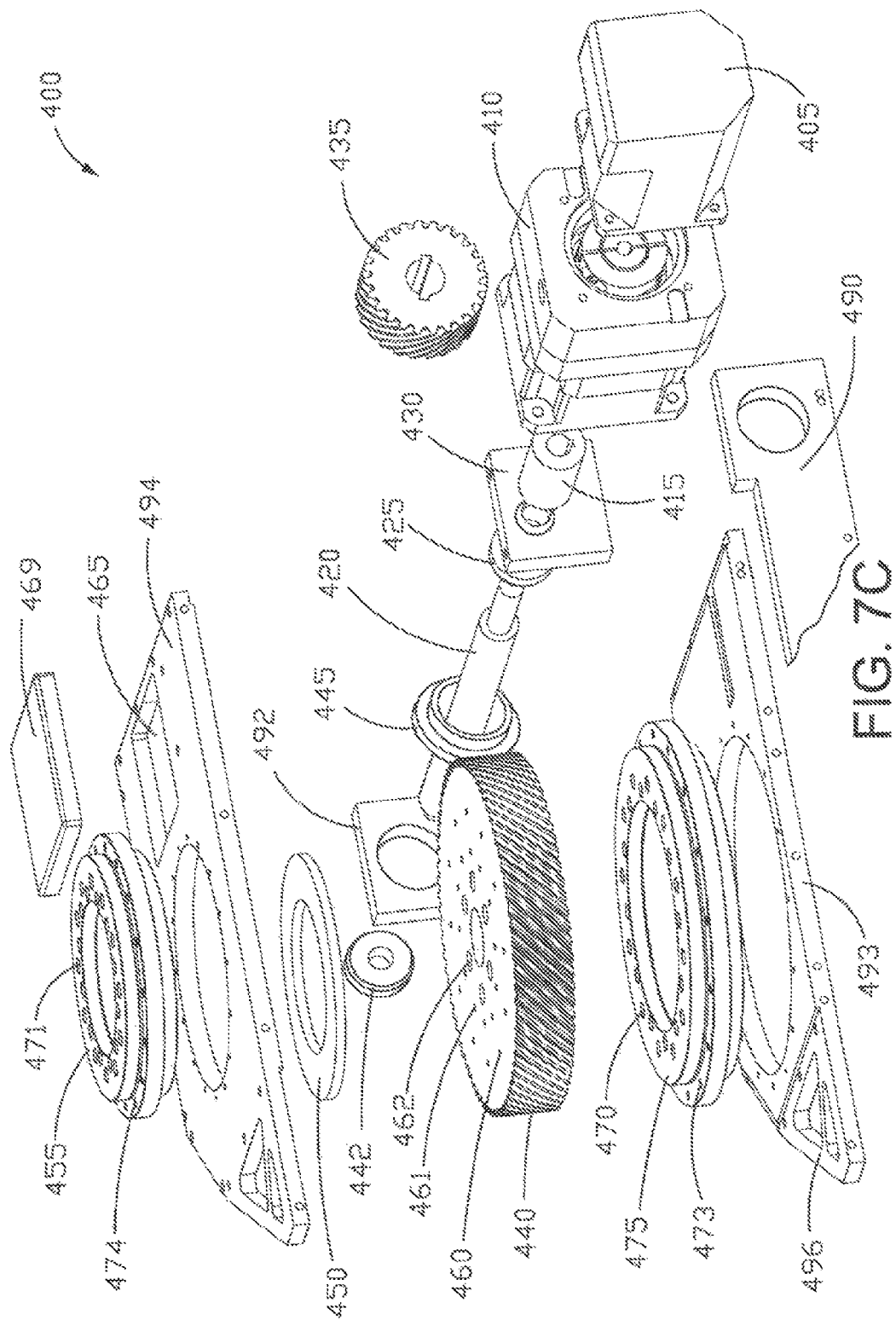
FIG. 7C is an exploded view of the rotating platform portion shown in FIG. 7A.
Figure 7D:
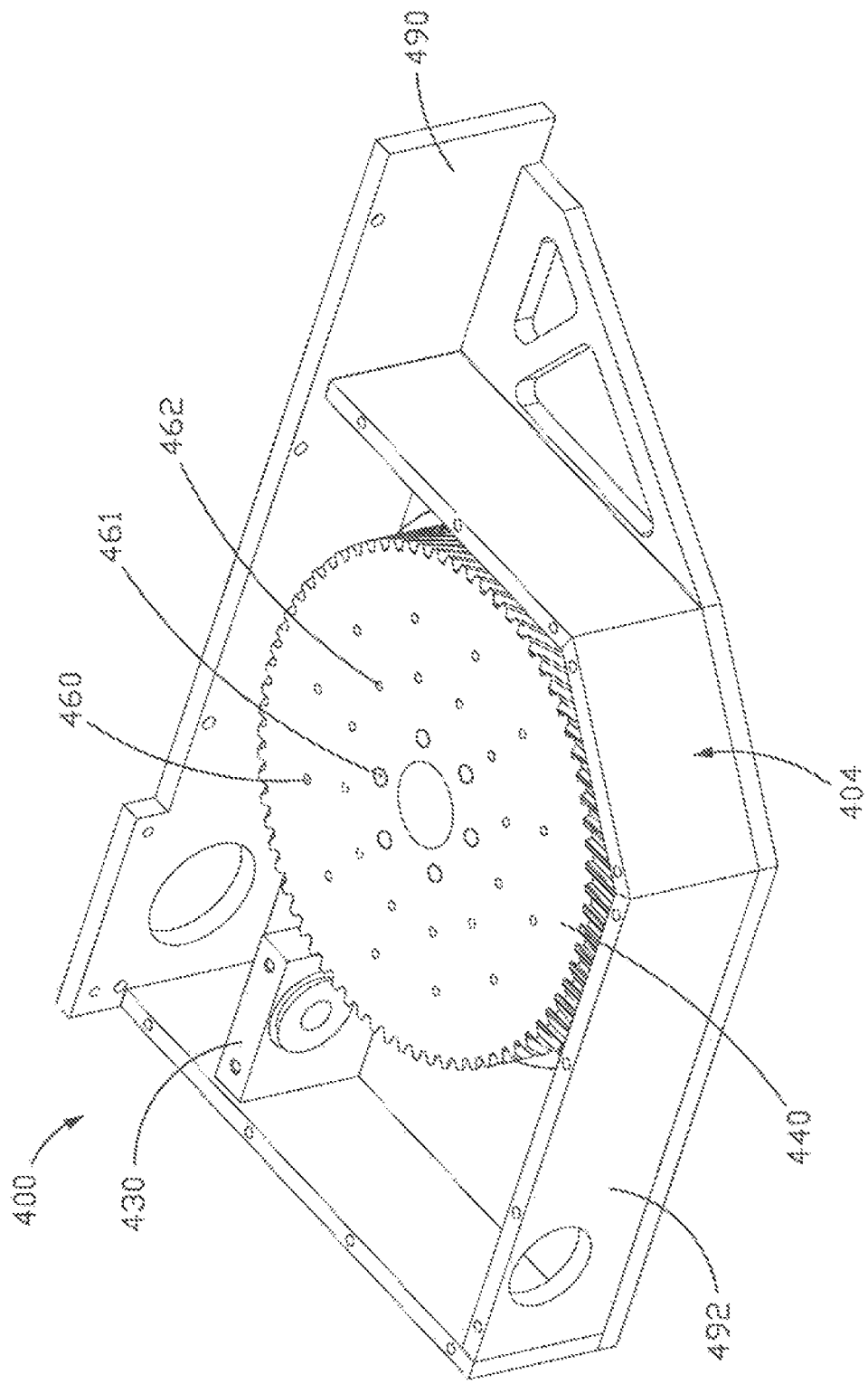
FIG. 7D is a top perspective view of the rotating platform shown in FIG. 7A with a top wall of the housing and end cap removed.

As shown in FIGS. 6C and 6D, a second horizontal shaft 332 extends through the large helical gear 330 on one side and terminates in a angled roller bearing 334 which is housed within an end cap 336 that is fixed in an aperture in the center wall 394 of the sweep gearbox housing 341. On the other side of the large helical gear 330, the second horizontal shaft 332 terminates in a shaft coupling 338. Extending out from the shaft coupling 338 on an opposite side is a sweep gearbox output shaft 342. The sweep gearbox output shaft 342 extends through a radial bearing 340 which is fixed within an aperture of the side wall 396 of the sweep gearbox housing 341. The sweep gearbox output shaft 342 extends through the side wall 396 of the sweep gearbox housing 341 and terminates in the shaft support bracket 275. When the control system 600 sends a signal to the sweep gearbox motor 302, the series of gears in the sweep gearbox 300 rotate as described above to thereby correspondingly rotate the mechanical arm 200, and thus the saw assembly 100, about the second axis. The side wall 396 of the sweep gearbox housing 341 defines a recess 398 that is configured to receive the housing of the rotating platform 400.

Now in reference to FIGS. 7A-7F, the rotating platform 400 includes a housing 404 that includes a front side wall 490, an opposing rear side wall 492 a top wall 494, and an opposing bottom wall 493. The front side wall 490 has a lateral length that is greater than a lateral length of the rear side wall 492. Accordingly, top wall 494 and the bottom wall 493 are irregularly shaped. The extended length of the front side wall 490 protrudes beyond the rest of the housing 404 to provide a connection point for the recess 398 of the sweep gearbox 300.

The rotating platform 400 is configured to rotate the saw assembly 100 about the third axis. As shown, the rotating platform 400 includes a third or rotating platform motor 405 and a third or rotating platform gearbox 410. As will be described, the rotating platform motor 405 is actuated by control system 600. In the illustrative embodiment, the rotating platform motor 405 is a Danaher Motion stepper motor model no. K32HCLG-LNK-NS-01 and the rotating platform gearbox 410 is a Thomson Micron 40:1 gearbox model no. NT42-040. This motor and gearbox may be purchased from G&G Technical, Inc. in Paoli, Pa. Though it should be understood that any rotating platform motor 405, and any rotating platform gearbox 410 may be used as desired.

The rotating platform gearbox 410 is mounted to the side wall 490 of the rotating platform housing 404. A shaft of the rotating platform gearbox 410 extends through an aperture in the side wall 490 of the rotating platform housing 404 and terminates inside a shaft coupling 415. From the shaft coupling 415, a horizontal shaft extends through a thrust bearing 425 housed within a bearing housing 430, further through a small helical gear 435, and terminates in a thrust bearing 440 which is housed within an end cap 445 fixed within the rear side wall 492 of the rotary platform housing 404.

The small helical gear 435 interacts with a large radius helical gear 440 positioned orthogonally to the small helical gear 435. The large radius helical gear 440 is sandwiched between a bottom slewing ring 475 and a top slewing ring 455, with a spacer 450 between the top slewing ring 455 and the large radius helical gear 440. The spacer 450 functions to maintain contact between the large radius helical gear 440 and the top slewing ring 455 due to the dimensional constraints of the components. The large radius helical gear 440 includes three rings of mounting holes 460. The outermost ring of mounting holes 460 align with inner mounting holes 470 of the bottom slewing ring 475. The middle ring of mounting holes 461 align with inner mounting holes 471 of the top slewing ring 455. The slewing rings 475, and 455 are fixed to the large radius helical gear 440 by fasteners that extend through the mounting holes of the slewing rings 475, and 455 and into the respective mounting holes of the large radius helical gear 440. The bottom slewing ring 475 has an outer ring of mounting holes 473 for mounting to the bottom wall 496 of the rotating platform housing. Similarly, the top slewing ring 455 has an outer ring of mounting holes 474 for mounting to the top wall 494 of the rotating platform housing 404. The bottom slewing ring 475 and the top slewing ring 455 are bolted to the bottom wall 496 and the top wall 494, respectively using holes 474 and 473 respectively. In the illustrative embodiment, the fasteners are socket head cap screws, though it should be understood that any fasteners may be used as desired.

The large radius helical gear 440 also has an inner ring of large mounting holes 462 that align with the mounting holes 472 of the rotating platform mounting bracket 505. The cutting device 10 can be fixed to the boom arm 500 by fixing the rotating platform mounting bracket 505 to the top slewing ring 455. In other embodiments, two brackets can be attached to the bottom slewing ring 475 and top slewing ring 455 in a sandwich configuration such that one bracket connects the top of the boom arm 500 to the top slewing ring 455 and a second bracket connects the bottom of the boom arm 500 to the bottom slewing ring 475. In the illustrative embodiment, the bottom slewing ring 475 and top slewing ring 455 are igus slewing rings. The top slewing ring 455 may be model no. PRT-01-100. The bottom slewing ring 475 may be model no. PRT-01-150. These slewing rings may be purchased from igus in East Providence, R.I. Though it should be understood that any slewing rings or similar bearing assemblies may be used as desired.

Since the large radius helical gear 440 is fixed to the slewing rings 475 and 455, and to the boom arm 500, when the rotating platform motor 405 drives the small helical gear 435, the large radius helical gear 440 and the portions of the slewings rings 475, 455 fixed to the gear 440 remain stationary in relation to the rotating platform mounting bracket 505 while the portion of the slewing rings not fixed to the gear and the rest of the rotating platform housing 404 rotate about the third axis. In the illustrative embodiment, the dimensions of the small helical gear 435 cause it to protrude through the top wall 494 of the rotating platform housing 404. The small helical gear 435 may operate with such dimensions without interference from other the top wall 494, because there is a gap 465 in the top wall 494 of the rotating platform housing 404. To provide protection for the portion of the small helical gear 435 protruding through the gap 465, a cover plate 469 is fixed to the gap 465 in the top wall 494 of the rotating platform housing 404. The cover plate 469 may be fixed to the top wall 494 by socket cap head screws and sealed around the edges.

Referring now to 8, the cutting device 10 is capable of being retrofitted to a boom arm 500 with minimal alterations. Conventional boom arms 500 can include a base 510 that is configured to be attached to the a surface a vehicle, such as a fire truck, so as to rotate with respect to the surface about a first boom arm axis 511 (for instance about an axis that is normal to the surface), thereby providing a first degree of freedom of movement for the boom arm 500. The boom arm 500 further includes a first articulating boom 515 that extends out from the base 510 so as to define a first articulating joint 513 between the base 510 and the first articulating boom 515 that provides a second degree of freedom of movement for the boom arm 500. The first articulating joint 513 is configured to rotate the first articulating boom 515 about the base 510 about a second boom arm axis 507 that is substantially perpendicular to the first boom arm axis 511. The boom arm 500 further includes a second articulating boom 520 that extends out from the first articulating boom 515 so as to define a second articulating joint 517 disposed between the first articulating boom 515 and the second articulating boom 520. The second articulating joint 517 is configured to rotate the second articulating boom 517 about the first articulating boom 515 about a third boom arm axis 509 that can be substantially parallel to the second boom arm axis 507 or angularly offset with respect to the second boom arm axis 507, thereby providing a third degree of freedom of movement for the boom arm 500. The boom arm 500 can further include a telescoping boom 525 that extends out from the second articulating boom 520, and can be oriented in-line with the second articulating boom 520. The telescoping boom 525 can extend forward and rearward along its axis of elongation 505 so as to define a fourth degree of freedom of movement of the boom arm 500. The telescoping boom 525 can define a distal end that attaches to the cutting device 10. It should be appreciated that the boom arm 500 can be actuated in any manner as desired, for instance through manipulation of the control system 600, such that distal end of the telescoping boom 525 moves in at least one or more, up to all, directions L, T, and A, including any combination of directions L, T, and A, as desired.

In accordance with one embodiment, the cutting device 10 can be integrated with a pre-existing turret, such as a Crash Rescue Snozzle™ HRET without decreasing the structural integrity. The Crash Rescue Snozzle™ is a type of HRET that has a telescoping boom and is currently used to pierce structures and deliver water or foam to extinguish a fire.

As shown in FIG. 8, the control system 600 is configured to send control signals that cause the boom arm 500 to move along any of its degrees of freedom. For instance, the control system 600 may include a touch-screen human machine interface (HMI) 670 and a first joystick 656. An operator can manipulate the at least one of the joystick 656 and the HMI 670 so as to manipulate up to four degrees of freedom of movement of the boom arm 500. The control system 600 may also include a toggle switch 650. When the toggle switch 650 is in an "off" position, the operator controls the boom arm 500 by itself, while when the toggle switch 650 is in the "on" position, the operator controls the boom arm 500 and the cutting device 10. The toggle switch 650 may be an actual, physical switch or it may be an option selectable in the touch-screen human machine interface. When the toggle switch 650 is in the off position, the cutting device 10 does not operate and the operator can use the first joystick 656 to control solely the boom arm 500. When the toggle switch is in the on position, the operator can use the first joystick 656 as well as an additional device such as a second joystick 655, to control both the boom arm 500 and the cutting device 10. The toggle switch 650, joysticks 656, 655, and the HMI 670 communicate with the motion coordinator 660 of the control system 600. The motion coordinator 660 accepts user input from the joysticks 656, 655 and HMI 670 and sends signals through the control system 600 to the motors in the cutting device 10 and boom arm 500. The motion coordinator 660 also accepts input from the Hall effect sensor 610 and the sensors 620 and automatically adjusts movement of the motors so that the cutting portion 110 remains perpendicular to the cutting surface and the blade speed maintains a predetermined level. The HMI 670 accepts input of controls by the operator and also displays the readings of all operating sensors such as the Hall effect sensor 610. The motion coordinator 660 communicates with other parts of the control system 600 and the motors via signals that may be sent wirelessly or through wires running throughout the system.

In an emergency situation, when the cutting device 10 is attached to the boom arm 500, the cutting device 10 may be positioned in relative proximity to a desired target, such as a surface of an airplane fuselage. In that regard, the vehicle operator may position the vehicle in relative proximity to the fuselage. The position of the vehicle will be determined by the range of movement available on the boom arm 500. The same or a different operator may operate the first joystick 656 to control the boom arm 500 to position the cutting device 10 at the desired location of the cut. Once the remote controlled cutting device 10 is in position, the toggle switch 650 is switched to the on position, activating the control system 600 for the cutting device 10. At this point, the operator uses the HMI 670 to initiate a repositioning operation. During this repositioning operation, the HMI 670 displays the outputs of the four distance sensors 620 to thereby determine the distance between each individual distance sensor 620 and the fuselage. The control system 600 includes a motion coordinator 660 that determines how the cutting device 10 should be repositioned in order for the cutting portion 110 to be perpendicular to the cutting surface based on the values determined by the distance sensors 620. The motion coordinator may be a Trio type motion coordinator from G&G Technical, Inc. of Paoli, Pa. For the blade 112 to cut properly, it must remain perpendicular to the target surface at all times. Because the target surface may be curved, the distance sensors 620 constantly monitor the changing relationship of the blade 112 and the target surface and communicate with the motion coordinator 660 to ensure that perpendicularity is maintained. In case a single distance sensor 620 has a significantly different distance reading than the other three, such as the case may be if one distance sensor 620 is pointed at a window in the fuselage, heavy smoke, or other debris, a distance comparator determines which distance sensor 620 is giving the inaccurate reading and interpolates a projected distance based on the readings from the other three distance sensors 620. Based on the readings of the distance sensors 620, the motion coordinator 660, in conjunction with other parts of the control system 600 actuate the motors on the boom arm 500 and the cutting device 10 by generating control signals to reposition the cutting device 10 so that it is perpendicular to the cutting surface.

Once the saw assembly 100 is in the desired position perpendicular to the cutting surface of the fuselage, the operator actuates the cutting portion 110 by using the HMI 670 which, with the motion controller 660, generates a control signal to start the rotation of the blade of the cutting portion 110 and extends the telescoping boom 525 so that the cutting device 10 makes contact with the cutting surface. At this point, the operator uses the second joystick 655 to control the direction of the cut (i.e. up, down, left or right). If the first cut is a left-to-right cut, the operator moves the second joystick 655 to the right. In this embodiment, the second joystick 655 only controls the direction, and not the speed, of the cut. A boom arm speed calculating algorithm is used in conjunction with a preexisting boom arm sensors, the second joystick 655, and the Hall effect sensor 610 to determine how the boom arm moves in order to maintain a predetermined cutting speed.

Any adjustments as desired to maintain the cutting speed can be accomplished autonomously by the motion controller. For example, if the Hall effect sensor 610 indicates that the rotation of the blade 112 of the cutting portion 110 is relatively low, the boom speed will be slowed to compensate for the restriction of the blade. In addition to maintaining the cutting speed, the distance sensors 620 continually take measurements to check whether the device is still perpendicular to the surface, whether the blade is at the appropriate cut depth, and whether the cutting portion 110 is moving tangentially to any curved surfaces. Based on these parameters, the motion coordinator 660 autonomously controls up to seven degrees of freedom of motion to maintain the proper cutting position perpendicular to the surface of the fuselage. Since the surface of the fuselage is curved, the motion coordinator 660 sends frequent signals to the motors to maintain the perpendicularity of the cutting portion 110 as the cutting device 10 moves about the fuselage.

While the cut is progressing, the HMI 670 displays sensor readings, such as the current distance of the cut and the speed of the saw's rotation. Once the operator has determined that the first cut is of sufficient length, he can use the HMI 670 and the motion coordinator 660 to initiate an automatic rotation operation so that the saw cuts along a predetermined direction or orientation. The saw blade pulls out of the cutting surface, the saw assembly 100 is rotated 90 degrees or the desired angle, and re-enters the cutting surface so that a second cut can be made orthogonally to the first cut. The process described above is repeated, and the operator uses the second joystick 655 to control the direction of the cut top-to-bottom instead of left-to-right. Once the operator has determined that the second cut is of sufficient length, he can use the HMI 670 and the motion coordinator 660 to create a mirror cut. The user creates a mirror cut based on the information of the two existing cuts through the HMI 670. For example, if two perpendicular cuts of 8 feet and 10 feet are made, the operator can send a signal through the HMI 670 to the motion coordinator 660 to automatically make a second set of 8 foot and 10 foot cuts that mirror the first set of cuts to make a complete rectangle. By using the HMI 670 to initiate the mirror cut operation, each of the first two cuts (e.g. left-to-right and top-to-bottom) are mirrored such that the same distances are used for the corresponding third and fourth cuts, but the third cut is right-to-left instead of left-to-right and the fourth cut is bottom-to-top instead of top-to-bottom. In this way, a rectangular access panel may be cut precisely with a minimal amount of necessary operator control.

In addition to the distance sensors 620, the Hall effect sensor 610 determines the speed of the saw's rotation so that the operator may diagnose possible problems with the cutting operation or to automatically retain a constant cutting depth. For example, a drop in the saw blade rotation speed might indicate to the operator that the saw blade is not perpendicular to the cutting surface. This could result in the blade bending or breaking if not corrected in time. Additionally, a decrease in the speed of the saw blade rotation might be indicative of the blade gumming up or melting which might occur if the movement of the cut itself was being conducted at too great a speed.

While the semi-autonomous operation of the cutting device 10 is considered a useful capability, a preferred embodiment of the invention also includes a manual override to give the operator full control of the system. The nature of certain emergency conditions is such that full manual control may become preferable to semi-autonomous control. The HMI 670 can include a manual override actuator that can be provided as a switch 680, such as a toggle switch that can be moved between a first position and a second position that causes the control system to operate in the above-described semi-autonomous mode and a second position that causes the control system to operate in a manual override mode whereby movement of the joysticks 656, 655 and HMI 670 control the movement of the boom arm 500 and cutting device 10 without the automatic adjustments described above. The manual mode may be advantageous for conditions that cannot be handled autonomously. For example, some cuts may need to be irregularly shaped rather than rectangular.

It will be appreciated by those skilled in the art that changes could be made to the embodiment described above without departing from the broad inventive concept thereof. Furthermore, it should be appreciated that the structure, features, and methods as described above with respect to any of the embodiments described herein can be incorporated into any of the other embodiments described herein unless otherwise indicated. It is understood, therefore, that this invention is not limited to the particular embodiments disclosed, but it is intended to cover modifications within the spirit and scope of the present disclosure. For example, while the device has been described in relation to an airplane fuselage, it will be appreciated that there are many other applications for the device. For example, a similar device could be used to cut access points into buildings or other structures in emergency situations. Such access point may be cut through the roof of a burning building.

What is claimed:

1. A cutting device configured to attach to a boom arm, the cutting device comprising:
   a saw assembly including a cutting portion configured to cut into a target surface, the saw assembly comprising a saw blade extending in a blade plane and mounted on a support arm;
   a motor assembly coupled to the saw assembly, the motor assembly including a first motor configured to rotate the saw assembly about a first axis, a second motor configured to rotate the saw assembly about a second axis, and a third motor configured to rotate the saw assembly about a third axis; and a control system operatively connected to the motor assembly, wherein the control system is configured to actuate the first, second, and third motors to thereby rotate the saw assembly about the first, second, and third axes; and
   four distance measuring sensors mounted on the support arm such that the four distance measuring sensor pivot with the saw assembly, with two of the four sensors mounted on a first side of the blade plane in a first sensor plane parallel to the blade plane, and a remaining two of the four sensors mounted on a second side of the blade plane in a second sensor plane parallel to the blade plane, the four distance measuring sensors all configured to, in conjunction with the control assembly, determine a distance between the saw assembly and the target surface.

2. The cutting device of claim 1, wherein the control system is configured actuate the motor assembly such that the saw assembly cuts along a predetermined direction or along a predetermined path on the target surface.

3. The cutting device of claim 1, further comprising a hall effect sensor mounted on the saw assembly.

4. The cutting device of claim 1, wherein the control system is semiautonomous.

5. The cutting device of claim 4, wherein the control system is configured to record initial cut lengths performed manually by an operator and to cut an aperture by mirroring the recorded initial cut lengths.

6. The cutting device of claim 4, wherein the control system in conjunction with a hall effect sensor is configured to detect regions of varying thickness of the target surface and automatically adjusts the saw assembly.

7. The cutting device of claim 1, wherein the first axis extends along a longitudinal direction from a proximal end of the saw assembly to a proximal end of the saw assembly, the second axis extends vertically along a transverse direction that is perpendicular to the longitudinal direction, and the third axis extends laterally along a lateral direction that is perpendicular to the longitudinal direction and the transverse direction.

8. A cutting device configured to attach to a boom arm, the cutting device comprising:
   a saw assembly including a cutting portion configured to cut into a target surface, the saw assembly comprising a saw blade mounted on a movable support arm extending in a plane;
   a motor assembly coupled to the saw assembly, the motor assembly including at least three motors configured to rotate the saw assembly about three different axes; and
   a control system operatively connected to the motor assembly;
   a first structure connected to the support arm;
   a second structure connected to the support arm and extending a parallel to the first structure;
   a first distance measuring sensor mounted to the first structure on one side of the plane;
   a second distance measuring sensor mounted the first structure of an opposing side of the plane; and
   a third distance measuring sensor mounted on the second structure on the one side of the plane,
   wherein the control system is configured to position the saw assembly to cut the target surface based on feedback from the sensors, and wherein the sensors move with the support arm.

9. The cutting device of claim 8, wherein the control system further comprises a hall effect sensor that is configured to maintain cutting depth of the saw assembly.

10. The cutting device of claim 8, wherein the control system is configured so that at least one of the three sensors is configured to maintain predetermined directionality of cutting relative to the target surface in conjunction with the control system.

11. The cutting device of claim 8, wherein the saw assembly is mounted to a mechanical arm that is operatively coupled to a sweep gearbox, and a rotating platform.

12. The cutting device of claim 11, wherein the control system is configured to use feedback from the three sensors to activate the mechanical arm, sweep gearbox, and rotating platform to thereby rotate the saw assembly.

13. A semi-autonomous rescue system comprising a cutting device mounted to a high reaching extendible turret, the cutting device comprising:
   a saw assembly including a cutting portion configured to cut into a target surface, the saw assembly comprising a saw blade extending from a support arm in a blade plane;
   a motor assembly coupled to the saw assembly;
   a control system operatively connected to the motor assembly and the high reaching extendible turret and configured to manipulate movement of the saw assembly along at least seven axes through actuation of the high reaching extendible turret and the motor assembly; and
   at least three distance measuring sensors mounted on the saw assembly, with two of the at least three sensors mounted on a first side of the blade plane and in a first sensor plane parallel to the blade plane, and a remaining sensor of the at least three sensors mounted on second side of the blade plane, wherein each of the at least three sensors points along its own sensor axis, wherein all of the sensor axes are parallel with each other, the at least three distance measuring sensors all configured to, in conjunction with the control assembly, determine a distance between the saw assembly and the target surface.

14. The cutting device of claim 13, wherein the control system receives user input from a remote location.

15. The cutting device of claim 13, wherein the control system further comprises at least two three-degree-of-freedom joysticks.

16. The cutting device of claim 13, wherein the control system further comprises at least one three-degree-of-freedom joystick and at least one touch screen interface.

17. The cutting device of claim 13, wherein the motor assembly includes at least three motors, each motor configured to rotate the saw assembly about a separate axis.

* * * * *